US012586533B2

(12) United States Patent
Kim

(10) Patent No.: US 12,586,533 B2
(45) Date of Patent: Mar. 24, 2026

(54) GATE DRIVER AND DISPLAY DEVICE INCLUDING SAME

(71) Applicant: LG Display Co., Ltd., Seoul (KR)

(72) Inventor: Jung Ha Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 227 days.

(21) Appl. No.: 18/514,677

(22) Filed: Nov. 20, 2023

(65) Prior Publication Data

US 2024/0221682 A1 Jul. 4, 2024

(30) Foreign Application Priority Data

Dec. 29, 2022 (KR) ........................ 10-2022-0189303

(51) Int. Cl.
*G09G 3/3266* (2016.01)
*G09G 3/20* (2006.01)

(52) U.S. Cl.
CPC ......... *G09G 3/3266* (2013.01); *G09G 3/2096* (2013.01); *G09G 2310/021* (2013.01); *G09G 2310/08* (2013.01); *G09G 2330/021* (2013.01)

(58) Field of Classification Search
CPC ............... G09G 3/3236; G09G 3/2096; G09G 2310/021; G09G 2310/08; G09G 2330/021
USPC .......................................................... 345/204
See application file for complete search history.

(56) References Cited

U.S. PATENT DOCUMENTS

| | | | | |
|---|---|---|---|---|
| 2014/0176412 A1* | 6/2014 | Oh | G09G 3/3611 | 345/99 |
| 2016/0148556 A1* | 5/2016 | Tseng | G09G 3/3677 | 345/55 |
| 2020/0005701 A1* | 1/2020 | Chen | G09G 3/2092 | |
| 2021/0166635 A1* | 6/2021 | In | G09G 3/2014 | |

* cited by examiner

*Primary Examiner* — Mark Edwards
(74) *Attorney, Agent, or Firm* — Birch, Stewart, Kolasch & Birch, LLP

(57) ABSTRACT

A gate driver can include a plurality of stages configured to output scan signals. An output of each stage among the plurality of stages is configured to connect to a pair of gate lines that are adjacent to each other, output an odd-numbered scan signal to an odd-numbered line among the pair of gate lines according to a first driving frequency, and output an even-numbered scan signal to an even-numbered line among the pair of gate lines according to the first driving frequency. Also, a phase difference between the odd-numbered scan signal and the even-numbered scan signal is 180 degrees.

18 Claims, 13 Drawing Sheets

GATE DRIVER AND DISPLAY DEVICE INCLUDING SAME

CROSS REFERENCE TO RELATED APPLICATION

This application claims priority to Korean Patent Application No. 10-2022-0189303, filed in the Republic of Korea, on Dec. 29, 2022, the entirety of which is hereby incorporated by reference into the present application as if fully set forth herein.

BACKGROUND

Field of the Invention

The present disclosure relates to a gate driver and a display device including the same.

Discussion of the Related Art

With the development of information technology, display devices as connection media between a user and information have become increasingly important, and various types of display devices such as an electroluminescent display device and a liquid crystal display device are being utilized.

Such display devices can provide high-quality images as a frame rate, which is the number of frames displayed per second, increases. Accordingly, display devices having a high frame rate can be provided by constructing an image driving circuit using a high-speed switching device having a high switching speed.

However, since high-speed switching devices consume a lot of power or are expensive, restrictions can be imposed and design freedom can be limited. Therefore, a method of providing a high frame rate with low power consumption at a low cost is desired.

SUMMARY OF THE DISCLOSURE

Accordingly, the present disclosure is directed to a gate driver and a display device including the same that substantially obviate one or more problems due to limitations and disadvantages of the related art.

The present disclosure provides a display device and a gate driver thereof capable of providing a high frame rate with low power consumption at a low cost.

Additional advantages, objects, and features of the disclosure will be set forth in part in the description which follows and in part will become apparent to those having ordinary skill in the art upon examination of the following or can be learned from practice of the disclosure. The objectives and other advantages of the disclosure can be realized and attained by the structure particularly pointed out in the written description and claims hereof as well as the appended drawings.

To achieve these objects and other advantages and in accordance with the purpose of the disclosure, as embodied and broadly described herein, a gate driver outputting scan signals to gate lines of a display panel includes a plurality of stages outputting scan signals, in which an output of each stage is connected to a pair of gate lines adjacent to each other such that an odd-numbered scan signal is output to an odd-numbered line between the pair of gate lines according to a first driving frequency, an even-numbered scan signal is output to an even-numbered line according to the first driving frequency, the odd-numbered scan signal and the even-numbered scan signal being output with a phase difference of 180 degrees.

In another aspect of the present disclosure, a display device includes a display panel in which data lines and gate lines intersect and a plurality of sub-pixels are disposed on each of pixel lines, a data driver configured to supply data voltages to the data lines, a gate driver configured to supply scan signals to the gate lines, and a timing controller configured to control the data driver and the gate driver, in which the timing controller divides frame data of input image data into odd line frame data and even line frame data according to display order, and controls display cycles of the odd line frame data and the even line frame data to have a phase difference such that the odd line frame data is displayed on odd horizontal lines of the display panel according to a first frame frequency and the even line frame data is displayed on even horizontal lines of the display panel according to the first frame frequency.

It is to be understood that both the foregoing general description and the following detailed description of the present disclosure are examples and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION OF THE EMBODIMENTS

Figure 1:
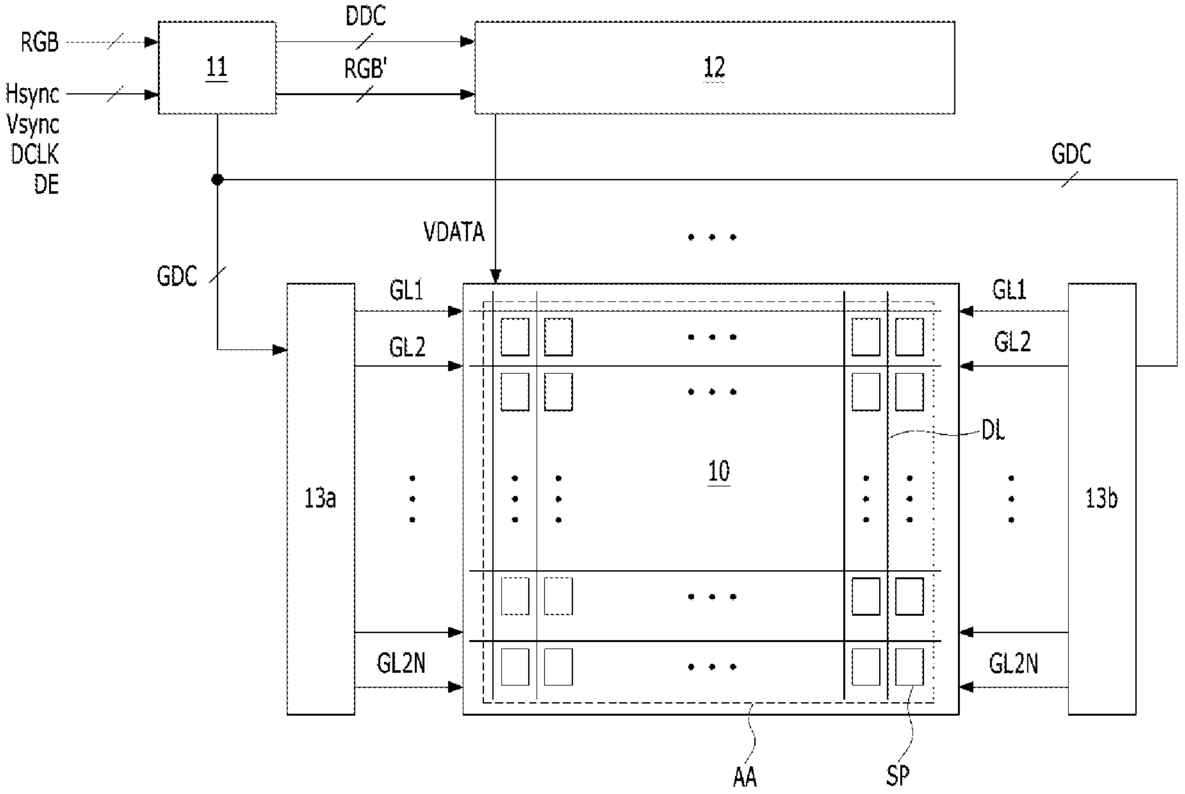
FIG. 1 is a block diagram showing a configuration of a display device according to an embodiment of the present disclosure.

The advantages, features and methods for accomplishing the same of the present disclosure will become more apparent through the following detailed description with respect to the accompanying drawings. However, the present disclosure is not limited by embodiments described below and is implemented in various different forms, and the embodiments are provided so that this disclosure will be thorough and complete, and will fully convey the scope of the disclosure to those skilled in the art.

Shapes, sizes, ratios, angles, numbers, etc. shown in the figures to describe embodiments of the present disclosure are exemplary and thus are not limited to particulars shown in the figures. Like numbers refer to like elements throughout the specification. It will be further understood that, when the terms "include," "have" and "comprise" are used in the present disclosure, other parts can be added unless "only" is used. An element described in the singular form is intended to include a plurality of elements unless context clearly indicates otherwise.

In interpretation of a component, the component is interpreted as including an error range unless otherwise explicitly described.

It will be understood that, when an element is referred to as being "on," "above," "under" or "by" another element, it can be "directly" on or under another element or can be "indirectly" formed such that an intervening element is also present.

In the following description of the embodiments, "first" and "second" are used to describe various components, but such components are not limited by these terms. The terms are used to discriminate one component from another component. Accordingly, a first component mentioned in the following description can be a second component within the technical spirit of the present disclosure.

In addition, a pixel circuit of a display device which will be described below can include a plurality of transistors. The transistors can be implemented as oxide thin film transistors (TFTs) including oxide semiconductors, low temperature polysilicon (LTPS) TFTs including LTPS, and the like. Each transistor can be implemented as a p-channel TFT or an n-channel TFT.

A transistor is a three-electrode device including a gate, a source, and a drain. The source is an electrode that supplies carriers to the transistor. In the transistor, carriers begin to flow from the source. The drain is an electrode through which carriers exit the transistor. In the transistor, carriers flow from the source to the drain. In the situation of an n-type transistor, a source voltage is lower than a drain voltage such that electrons can flow from the source to the drain because carriers are electrons. In an n-type transistor, current flows from the drain to the source. In the situation of a p-type transistor (PMOS), a source voltage is higher than a drain voltage such that holes can flow from the source to the drain because carriers are holes. In a p-type transistor, current flows from the source to the drain because holes flow from the source to the drain. It should be noted that the source and the drain of the transistor are not fixed. For example, the source and the drain can be changed according to an applied voltage. Accordingly, the disclosure is not limited by the source and the drain of the transistor. In the following description, the source and the drain of the transistor will be referred to as first and second electrodes.

A gate signal swings between a gate on voltage and a gate off voltage. The gate-on voltage is set to a voltage higher than the threshold voltage of the transistor, and the gate-off voltage is set to a voltage lower than the threshold voltage of the transistor. The transistor is turned on in response to the gate-on voltage and turned off in response to the gate-off voltage. In the situation of an n-type transistor, the gate-on voltage can be a gate high voltage (VGH) and the gate-off voltage can be a gate low voltage (VGL). In the situation of a p-type transistor, the gate-on voltage can be the gate low voltage VGL, and the gate-off voltage can be the gate high voltage VGH.

Each of pixels of an electroluminescent display device includes a light emitting element and a driving element that drives the light emitting element by generating a pixel current according to a gate-source voltage. The light emitting element includes an anode, a cathode, and an organic compound layer formed between the anode and the cathode. The organic compound layer includes a hole injection layer (HIL), a hole transport layer (HTL), an emission layer (EML), an electron transport layer (ETL), an electron injection layer (EIL), and the like, but is not limited thereto. When the pixel current flows through the light emitting element, holes that have passed through the hole transport layer (HTL) and electrons that have passed through the electron transport layer (ETL) move to the light emitting layer (EML) to generate excitons, and as a result, the light emitting layer (EML) can emit visible light.

Recently, an increasing number of attempts have been made to implement some transistors included in a pixel circuit of an electroluminescent display device as oxide transistors. An oxide transistor uses an oxide, for example, IGZO, which is a combination of In (indium), Ga (gallium), Zn (zinc), and O (oxygen), instead of polysilicon as a semiconductor material.

Oxide transistors have lower electron mobility than low temperature polysilicon (LTPS) transistors but have more than 10 times higher electron mobility than amorphous silicon transistors, and are higher than amorphous silicon transistors but much lower than low-temperature polysilicon transistors in terms of manufacturing cost. In addition, since the manufacturing process of the oxide transistors is similar to that of the amorphous silicon transistors, there is an efficient advantage in that existing facilities can be utilized. In particular, since the oxide transistors have a low off current, driving stability and reliability are high during a low-speed operation with a relatively long off-period of the transistors. Therefore, the oxide transistors can be used in a large liquid crystal display that requires high resolution and low power consumption or an OLED TV that cannot cope with the screen size with a low-temperature polysilicon process.

A display device according to the present disclosure can be implemented as a television system, a video player, a personal computer (PC), a home theater, a vehicle electric apparatus, a smartphone, or the like, but the present disclosure is not limited thereto. The display device according to an embodiment of the present disclosure can be implemented as a light emitting display device (LED), a quantum dot display (QDD) device, a liquid crystal display (LCD) device, or the like. However, a light emitting display device that directly emits light based on inorganic light emitting diodes or organic light emitting diodes will be described as an example for convenience of description.

The features of various embodiments of the present disclosure can be partially or entirely coupled to or combined with each other and can be interlocked and operated in technically various ways, and the embodiments can be carried out independently of or in association with each other.

Like numbers refer to like elements throughout the specification. Hereinafter, embodiments of the present disclosure will be described in detail with reference to the attached drawings. In the following description, if a detailed description of known techniques associated with the present disclosure would unnecessarily obscure the gist of the present disclosure, detailed description thereof will be omitted. All the components of each display device according to all embodiments of the present disclosure are operatively coupled and configured.

Figure 2:
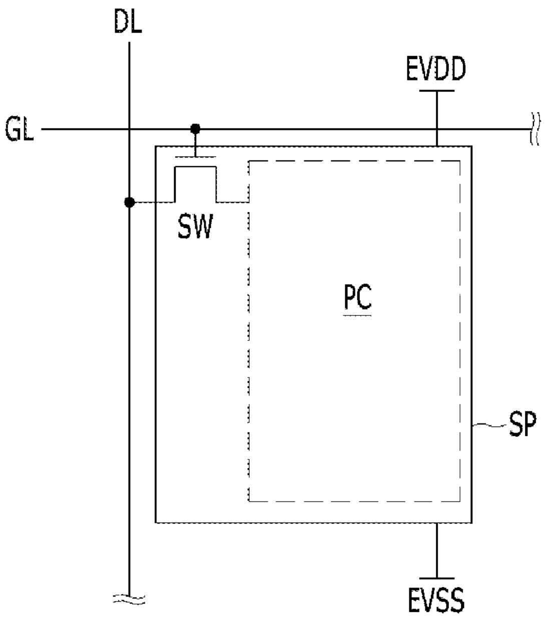
FIG. 2 is an equivalent circuit diagram of one sub-pixel included in the display device of FIG. 1 according to an embodiment of the present disclosure.
Figure 3:
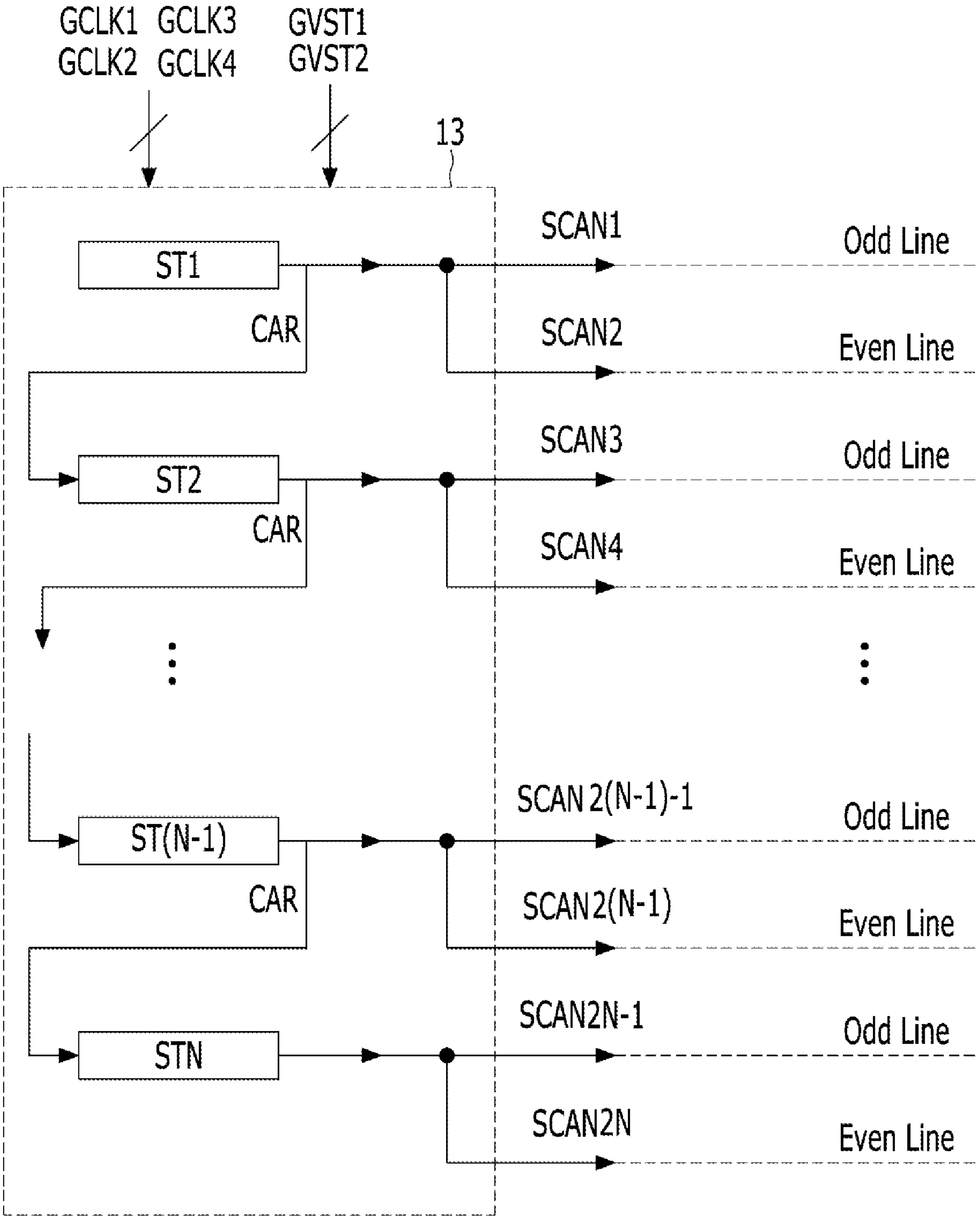
FIG. 3 is a block diagram showing a configuration of a gate driver according to an embodiment of the present disclosure.

FIG. 1 is a block diagram showing a configuration of a display device according to an embodiment of the present disclosure, and FIG. 2 is an equivalent circuit diagram of one sub-pixel included in the display device of FIG. 1. FIG. 3 is a block diagram showing a configuration of a gate driver according to an embodiment of the present disclosure.

As shown in FIG. 1, the display device according to the embodiment of the present disclosure can include a display panel 10 including a display area (active area) AA in which an image is displayed, a data driver 12 and a gate driver 13 that drive signal lines GL and DL of the display panel 10, and a timing controller 11 that controls operation timings of the data driver 12 and the gate driver 13.

In the display panel 10, a plurality of gate lines GL1 to GL2N and a plurality of data lines DL intersect in the display area AA in which an image is displayed, and a plurality of sub-pixels SP is disposed at intersections of the gate lines GL1 to GL2N and the data lines DL in a matrix form. The data lines DL apply a data signal VDATA output from the data driver 12 to the sub-pixels SP. The gate lines GL1 to GL2N can supply a gate signal corresponding to an addressing period for supplying the data signal VDATA to the sub-pixels SP. As shown in FIG. 2, one sub-pixel SP can be connected to a data line DL, a gate line GL, a first power line EVDD, and a second power line EVSS. One sub-pixel SP includes a switching transistor SW that transfers a data voltage (or data signal) VDATA input through the data line DL in response to a gate signal input through the gate line GL, and a pixel circuit PC that emits light in response to the data voltage. The pixel circuit PC can include a driving transistor that generates a driving current, an organic light emitting diode (OLED) that emits light in response to the driving current, and the like. An array of sub-pixels SP disposed on the same gate line GL is referred to as one horizontal line HL. The sub-pixels SP of the same horizontal line HL are turned on by the same scan signal to receive a data voltage input to the data line DL connected to each sub-pixel SP.

The timing controller 11 can supply a data control signal DDC for controlling operation timing of the data driver 12 and a gate control signal GDC for controlling operation timing of gate drivers 13*a* and 13*b* based on timing signals such as a vertical synchronization signal Vsync, a horizontal synchronization signal Hsync, a dot clock signal DCLK, and a data enable signal DE. The timing controller 11 can rearrange digital video data RGB input from the outside line by line in accordance with the resolution of the display panel 10, and supply the rearranged digital video data RGB' to the data driver 12.

Here, the timing controller 11 divides frame data of input image data into odd line frame data and even line frame data according to display order. Odd line frame data is data written in sub-pixels of odd horizontal lines of the display panel to display one image frame, and even line frame data is data written in sub-pixels of even horizontal lines of the display panel to display one image frame. That is, the odd line frame data and the even line frame data are data for displaying one image frame with only odd horizontal lines or even horizontal lines, and can have half the data capacity of existing frame data. The timing controller 11 performs control such that odd line frame data is written in sub-pixels of odd horizontal lines to emit light according to an input frame frequency, and then even line frame data is written in sub-pixels of even horizontal lines to emit light, and can control the data driver 12 and the gate drivers 13*a* and 13*b* such that the odd line frame data and the even line frame data are output with a phase difference of 180 degrees between the output cycle of the odd line frame data and the output cycle of the even line frame data.

The data driver 12 converts the rearranged digital video data RGB' into an analog data voltage based on the data control signal DDC. The data driver 12 can output the odd line frame data and the even line frame data at the same driving frequency with a phase difference of 180 degrees between the output cycles of the two frames to supply the data voltage VDATA to the sub-pixels SP through the data lines DL.

The gate drivers 13*a* and 13*b* can apply gate signals to the gate lines in a double feeding scheme. In the double feeding scheme, output terminals of the gate drivers 13*a* and 13*b* can be connected to both ends of the gate lines GL1 to GL2N to apply gate signals to both ends of the gate lines GL1 to GL2N (e.g., from opposite sides of the display panel). Each of the first and second gate drivers 13*a* and 13*b* can apply gate signals to the gate lines GL1 to GL2N based on the gate control signal GDC. The gate drivers can be provided in the double feeding scheme as shown in FIG. 1 or a single gate driver can be disposed on one side in a single feeding scheme. In addition, the gate drivers 13*a* and 13*b* can be implemented in the form of an IC or in a gate in panel structure, but the present disclosure is not limited thereto.

According to an embodiment of the present disclosure, the gate drivers 13*a* and 13*b* select odd lines or even lines, charge the sub-pixels of the selected lines with the data voltage VDATA, and then cause light emission. That is, an image can be output in a line-by-line manner in which an image is displayed by emitting light through odd-numbered gate lines and then an image is displayed by emitting light through even-numbered gate lines. The gate drivers 13*a* and 13*b* can display one frame using only odd lines or only even lines, and an image can be output with a phase difference of 180 degrees between a frame displayed by the odd lines and a frame displayed by the even lines. For example, at the time of displaying an image of 120 Hz, odd line frame data is displayed at 120 Hz and even line frame data is also displayed at 120 Hz with a phase difference of 180 degrees between an odd frame and an even frame. In this way, two halves of one full image are effectively interleaved with two frames (e.g., one odd frame followed by one even frame). When the image is switched at a high speed in this manner, a user does not recognize that each frame displays only even lines or odd lines, and thus can recognize that the image is driven at 240 Hz. In this way, the frame rate can be effectively doubled from a viewer's point of view while also reducing power.

FIG. 3 is a block diagram showing the configuration of the gate driver according to an embodiment of the present disclosure. The configuration of the gate driver 13 shown in FIG. 3 can be equally applied to the gate drivers 13*a* and 13*b* on both sides of the display panel.

Referring to FIG. 3, the gate control signal (GDC in FIG. 1) input to the gate driver 13 can include a first start signal GVST1, a second start signal GVST2, and clock signals GCLK1, GCLK2, GCLK3, and GCLK4.

The gate driver 13 can include a shift register including a plurality of stages ST1, ST2, . . . , ST(N−1), and STN sequentially connected to previous stages. The stages ST1, ST2, . . . , ST(N−1), and STN of the shift register can receive the start signals GVST1 and GVST2 or receive a carry signal CAR from the previous stages as a start signal, and output scan signals SCAN1 to SCAN2N when the clock signals GCLK1, GCLK2, GCLK3, and GCLK4 are input.

According to an embodiment of the present disclosure, the output of one stage among the stages ST1, ST2, . . . , ST(N−1), and STN can be connected to a pair of adjacent gate lines GL. Accordingly, the output of each stage can be connected to an odd line and an even line of the gate lines GL. In this way, the number of stages can effectively be reduced by half compared to the number of gate lines. For example, since one stage can service two different gate lines, there can be twice as many gate lines as there are stages. The stages can output odd-numbered scan signals SCAN1, SCAN3, SCAN2(N−1)−1, and SCAN2N−1 to odd lines and output even-numbered scan signals SCAN2, SCAN4, . . . , SCAN2(N−1), and SCAN2N to even lines. For example, a total of N stages ST1, ST2, . . . , ST(N−1), and STN can output 2N scan signals SCAN1, SCAN2, . . . , SCAN2N. For example, the circuit configuration for outputting scan signals can be reduced by half.

Each stage ST1, ST2, . . . , ST(N−1), and STN of the gate driver 13 selects an odd line or an even line and charges a data voltage VDATA in sub-pixels of the corresponding line, and then light emission occurs. For example, an image can be output in a line by line manner in which even-numbered gate lines emit light after odd-numbered gate lines emit light. The gate driver 13 displays one frame using either an odd line or an even line, and can output a gate signal such that a frame displayed through an odd line and a frame displayed through an even line are displayed with a phase difference of 180 degrees. For example, when displaying a 120 Hz image, odd line frame data is displayed at 120 Hz and even line frame data is also displayed at 120 Hz, but the odd and even frames can be displayed back-to-back, one right after the other, with a 180-degree phase difference. When the image is switched at high speed as described above, the user does not recognize that each frame displays only the even or odd line, and therefore can recognize that the corresponding image is driven at 240 Hz.

To this end, at the time of rearranging digital video data RGB input from the outside in accordance with the resolution of the display panel 10, the timing controller 11 can divide the digital video data RGB into odd line frame data and even line frame data, rearrange the data such that data of each frame can be input only to odd lines or even lines, and supply the data to the data driver 12.

Figure 4:
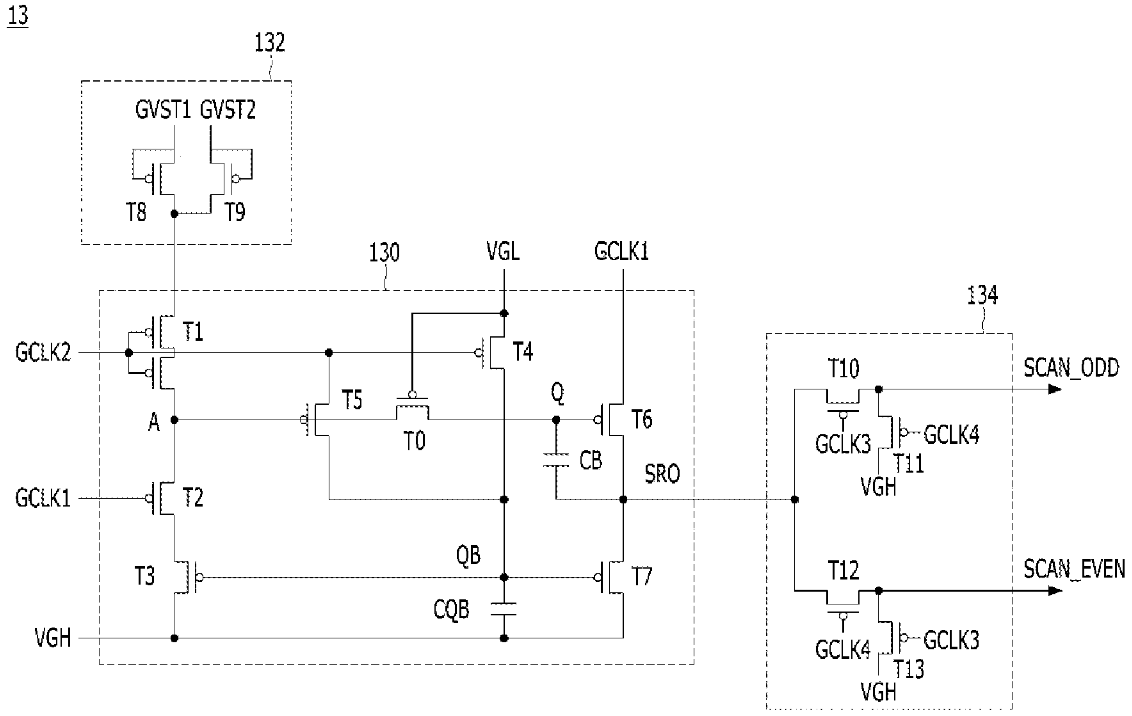
FIG. 4 is a circuit diagram showing the configuration of the gate driver according to an embodiment of the present disclosure.
Figure 5:
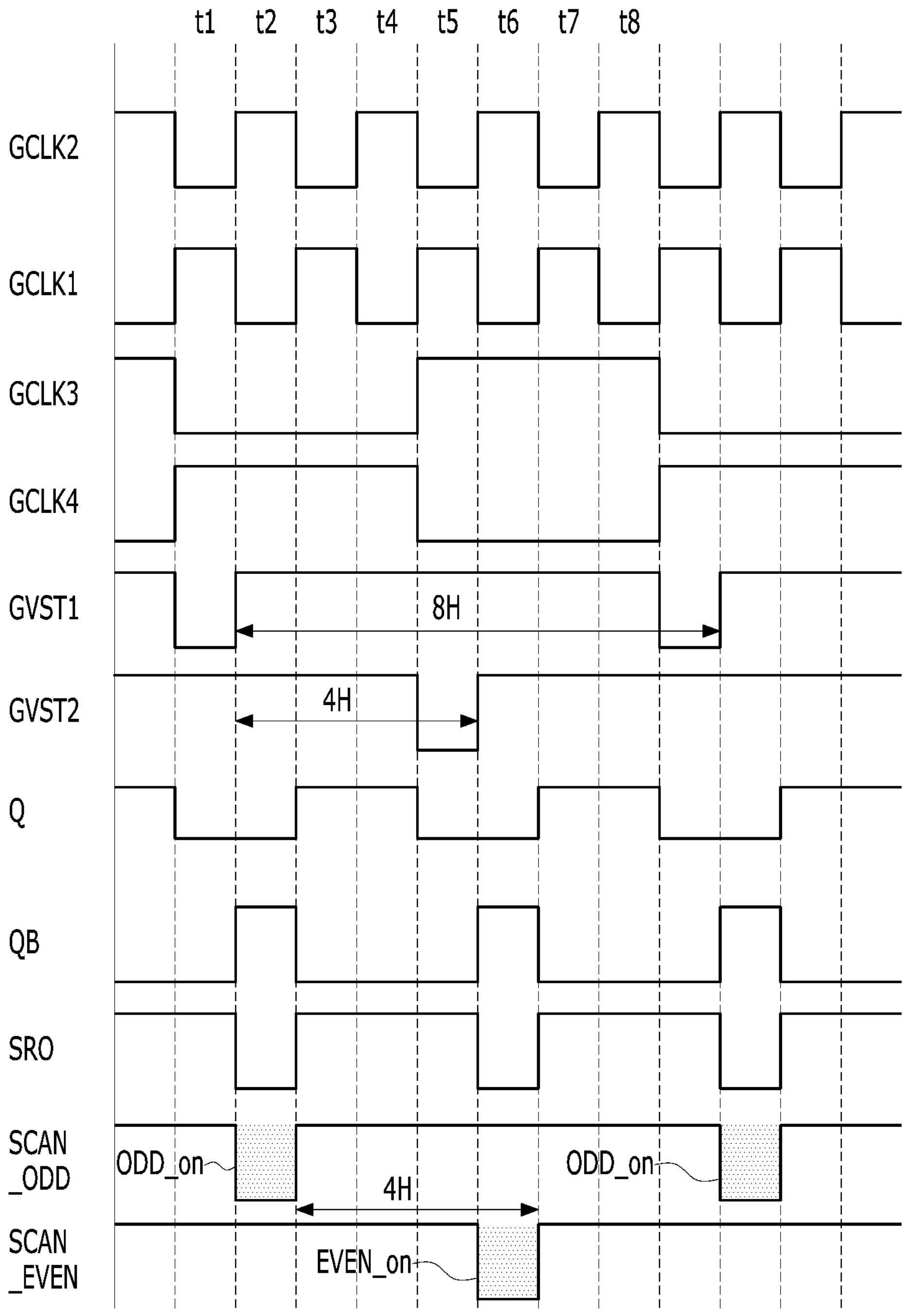
FIG. 5 is a diagram illustrating driving waveforms of the gate driver of FIG. 4 according to an embodiment of the present disclosure.

FIG. 4 is a circuit diagram showing the configuration of the gate driver according to an embodiment of the present disclosure, and FIG. 5 is a diagram illustrating driving waveforms of the gate driver of FIG. 4. The gate driver and the driving waveforms thereof shown in FIGS. 4 and 5 illustrate an example in which transistors of the shift register are implemented or configured as P-type TFTs. However, this is merely an example and the present disclosure is not limited thereto.

Referring to FIGS. 4 and 5, the stages constituting the shift register can include a start signal input circuit 132, a node Q, a node QB, a switch circuit 130 connected to the node Q and the node QB, and an output circuit 134 that outputs an odd line scan signal SCAN_ODD and an even line scan signal SCAN_EVEN.

The start signal input circuit 132 operates by receiving the first start signal GVST1 and the second start signal GVST2. The start signal input circuit 132 is turned off when both the first start signal GVST1 and the second start signal GVST2 are high signals, and can output a low signal when any one of the two signals is a low signal. Referring to FIG. 5, the first start signal GVST1 and the second start signal GVST2 have the same cycle 8H and a phase difference of 180 degrees therebetween. Accordingly, the first start signal GVST1 and the second start signal GVST2 are applied at an on level every 4H. The start signal input circuit 132 can output a low signal only when the first start signal GVST1 or the second start signal GVST2 is applied as a low signal which is an on level. Accordingly, the on-level signal can be applied to the switch circuit 130 at a cycle of 4H, which is half the cycle of the first start signal GVST1 and the second start signal GVST2.

The start signal input circuit 132 can include an eighth TFT T8 and a ninth TFT T9. When the first start signal GVST1 is a low signal, the eighth TFT T8 is turned on and outputs a low signal. The eighth TFT T8 can include a gate electrode to which the first start signal GVST1 is input, a first electrode to which the first start signal GVST1 is input, and a second electrode that is a start signal output terminal (e.g., the gate electrode and the first electrode of the eighth TFT T8 are connected together). When the second start signal GVST2 is a low signal, the ninth TFT T9 is turned on and outputs a low signal. The ninth TFT T9 can include a gate electrode to which the second start signal GVST2 is input, a first electrode to which the second start signal GVST2 is input, and a second electrode that is a start signal output terminal (e.g., the gate electrode and the first electrode of the ninth TFT T9 are connected together).

The switch circuit 130 can switch according to the first start signal GVST1 or the second start signal GVST2 input from the start signal input circuit 132, the first clock signal CLK1, and the second clock signal CLK2 to output a gate low voltage VGL or a gate high voltage VGH to the output terminal SRO of the shift register.

The switch circuit 130 can include 0-th to seventh TFTs T0 to T7, a node Q capacitor CB, and a node QB capacitor CQB.

The 0-th TFT T0 receives the gate low voltage VGL and always maintains a turned-on state to connect a node A with a node Q. The 0-th TFT T0 can transfer the voltage of the node A to the node Q by applying a current according to a voltage difference between the gate low voltage VGL and the voltage of the node A. Although the 0-th TFT T0 does not affect the operation of the switching circuit 130 because it is always turned on, even if the voltage level of the node A is not constant or an overvoltage is applied, the 0-th TFT T0 can stably transfer the voltage of the node Q and protect other elements. The 0-th TFT T0 can include a gate electrode to which the gate low voltage VGL is input, a first electrode connected to the node A, and a second electrode connected to the node Q. The first TFT T1 is turned on according to the second clock signal GCLK2 to transfer the output of the start signal input circuit 132 to the node A. The first TFT T1 can include a gate electrode to which the second clock signal GCLK2 is input, a first electrode connected to the output of the start signal input circuit 132, and a second electrode connected to the node A.

The second TFT T2 is turned on according to the first clock signal GCLK1 to connect the node A to a first electrode of the third TFT T3. The second TFT T2 can include a gate electrode to which the first clock signal GCLK1 is input, a first electrode connected to the node A, and a second electrode connected to the first electrode of the third TFT T3.

The third TFT T3 is turned on according to the power level of the node QB to apply the gate high voltage VGH to the second electrode of the second TFT T2. The third TFT T3 can include a gate electrode to which the power of the node QB is input, the first electrode connected to the second electrode of the second TFT T2, and a second electrode to which the gate high voltage VGH is applied.

The fourth TFT T4 is turned on according to the second clock signal GCLK2 to apply the gate low voltage VGL to the node QB. The fourth TFT T4 can include a gate electrode to which the second clock signal GCLK2 is input, a first electrode to which the gate low voltage VGL is applied, and a second electrode connected to the node QB.

The fifth TFT T5 is turned on according to the power level of the node A to apply the low level power of the second clock signal GCLK2 to the node QB. The fifth TFT T5 can include a gate electrode to which the power of the node A is input, a first electrode to which the second clock signal GCLK2 is applied, and a second electrode connected to the node QB.

The sixth TFT T6 is turned on according to the power level of the node Q to apply the first clock signal GCLK1 to the output terminal SRO of the shift register. The sixth TFT T6 can include a gate electrode connected to the node Q, a first electrode to which the first clock signal GCLK1 is input, and a second electrode connected to the output terminal SRO of the shift register.

The seventh TFT T7 is turned on according to the power level of the node QB to apply the gate high voltage VGH to the output terminal SRO of the shift register. The seventh TFT T7 can include a gate electrode connected to the node QB, a first electrode connected to the output terminal SRO of the shift register, and a second electrode to which the gate high voltage VGH is applied.

One electrode of the node Q capacitor CB is connected to the node Q and the other electrode is connected to the output terminal SRO of the shift register to charge the voltage between the node Q and the output terminal SRO of the shift register.

One electrode of the node QB capacitor CQB is connected to the node QB and the other electrode receives the gate high voltage VGH to charge the voltage between the node QB and the gate high voltage VGH.

The output circuit 134 can perform switching operation according to the third and fourth clock signals CLK3 and CLK4 to output the voltage of the output terminal SRO of the shift register or the gate high voltage VGH as the odd line scan signal SCAN_ODD and the even line scan signal SCAN_EVEN.

The output circuit 134 can include tenth and eleventh TFTs T10 and T11 that output the odd line scan signal SCAN_ODD and twelfth and thirteenth TFTs T12 and T13 that output the even line scan signal SCAN_EVEN.

The tenth TFT T10 can be turned on according to the third clock signal GCLK3 to output the voltage of the output terminal SRO of the shift register as the odd line scan signal SCAN_ODD. The tenth TFT T10 can include a gate electrode to which the third clock signal GCLK3 is input, a first electrode connected to the output terminal SRO of the shift register, and a second electrode connected to an odd-numbered gate line.

The eleventh TFT T11 can be turned on according to the fourth clock signal GCLK4 to output the gate high voltage VGH as the odd line scan signal SCAN_ODD. The eleventh TFT T11 can include a gate electrode to which the fourth clock signal GCLK4 is input, a first electrode to which the gate high voltage VGH is applied, and a second electrode connected to the odd-numbered gate line.

The twelfth TFT T12 can be turned on according to the fourth clock signal GCLK4 to output the voltage of the output terminal SRO of the shift register as the even line scan signal SCAN_EVEN. The twelfth TFT T12 can include a gate electrode to which the fourth clock signal GCLK4 is input, a first electrode connected to the output terminal SRO of the shift register, and a second electrode connected to an even-numbered gate line.

The thirteenth TFT T13 can be turned on according to the third clock signal GCLK3 to output the gate high voltage VGH as the even line scan signal SCAN_EVEN. The thirteenth TFT T13 can include a gate electrode to which the third clock signal GCLK3 is input, a first electrode to which the gate high voltage VGH is applied, and a second electrode connected to the even-numbered gate line.

Referring to FIG. 5, the first start signal GVST1 and the second start signal GVST2 input to the start signal input circuit 132 can have the same cycle 8H and a phase difference of 180 degrees. Accordingly, the first start signal GVST1 and the second start signal GVST2 can be applied at the on level every 4H. The odd line scan signal SCAN_ODD can be output at a turn-on level ODD_on for 1H as the first start signal GVST1 is applied, and the even line scan signal SCAN_EVEN can be output at a turn-on level EVEN_on for 1H as the second start signal GVST2 is applied. Since the first start signal GVST1 and the second start signal GVST2 have the same cycle of 8H, the odd line scan signal SCAN_ODD and the even line scan signal SCAN_EVEN can also be output in the cycle of 8H. Since the first start signal GVST1 and the second start signal GVST2 have a phase difference of 180 degrees, the odd line scan signal SCAN_ODD and the even line scan signal SCAN_EVEN can be alternately output every 4H. As a result, an effect of operating at twice the driving speed can be obtained.

The first and second clock signals GCLK1 and GCLK2 input to the switch circuit 130 can be input with a phase difference of 180 degrees while having the same cycle of 1H. Accordingly, the first and second clock signals GCLK1 and GCLK2 input at the same timing can have signal levels opposite to each other.

The third and fourth clock signals GCLK3 and GCLK4 input to the output circuit 134 can be input with a phase difference of 180 degrees while having the same cycle of 4H. Accordingly, the third and fourth clock signals GCLK3 and GCLK4 input at the same timing can have signal levels opposite to each other.

FIGS. 6 to 13 are diagrams showing the circuit operation of the gate driver in respective driving periods according to an embodiment of the present disclosure, illustrating operation of the gate driver during each period in a first period t1 to an eighth period t8.

Figure 6:
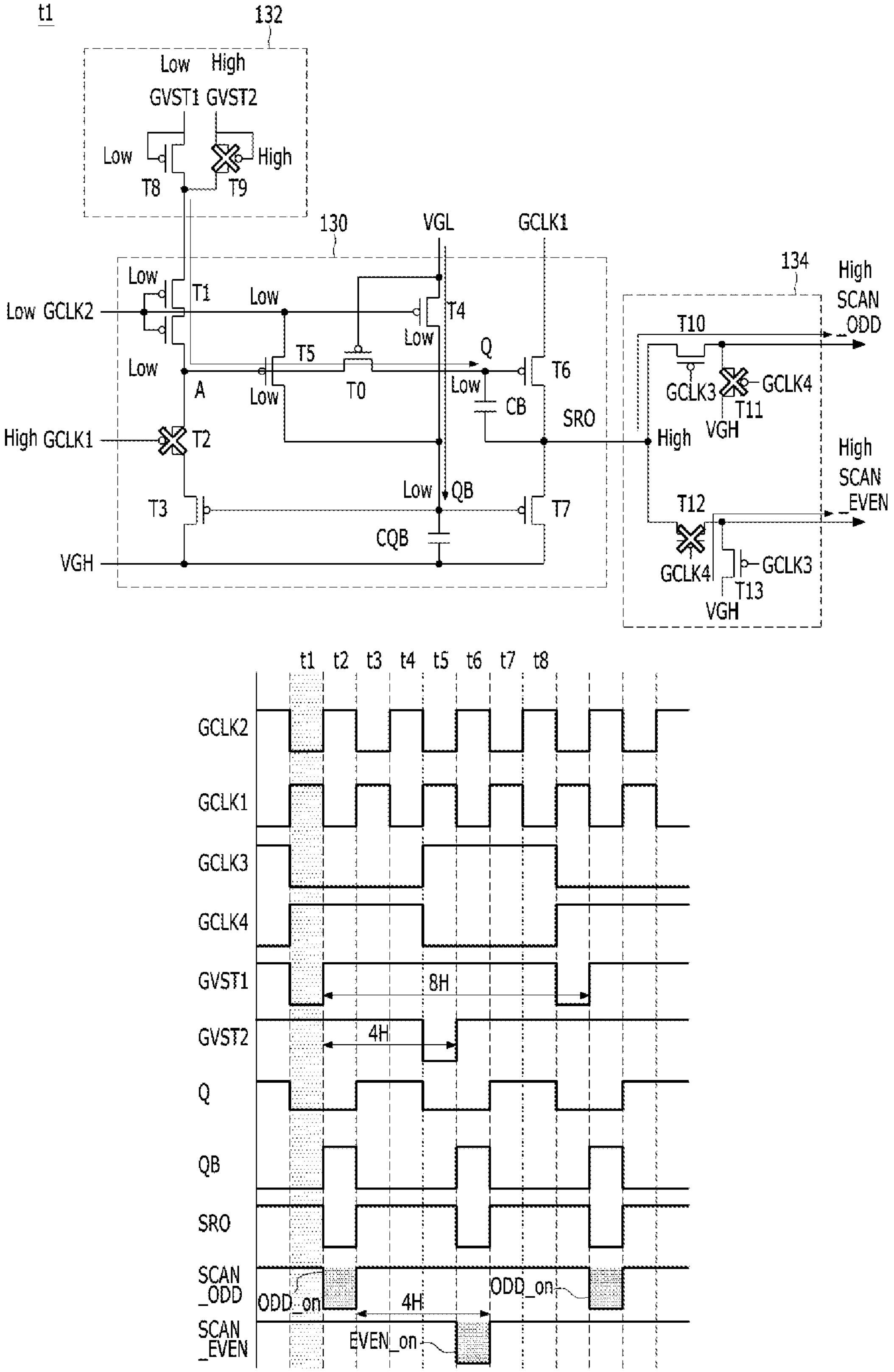
FIGS. 6 to 13 are diagrams illustrating circuit operations in respective operation periods of the gate driver according to an embodiment of the present disclosure.

Particularly, FIG. 6 is a diagram illustrating operation of the gate driver in the first period t1.

In the first period t1, the first start signal GVST1 can be applied as a low signal corresponding to the on level and the second start signal GVST2 can be applied as a high signal corresponding to the off level. As the first start signal GVST1 is input as the low signal, the eighth TFT T8 can be turned on. As the second start signal GVST2 is applied as the high signal, the ninth TFT T9 can be turned off. Accordingly, the low-level voltage of the first start signal GVST1 can be output from the start signal input circuit 132.

The first clock signal GCLK1 input to the switch circuit 130 can be applied as a high signal, and the second clock signal GCLK2 can be applied as a low signal corresponding to the on level.

As the first clock signal GCLK1 is applied as the high signal, the second TFT T2 can be turned off.

As the second clock signal GCLK2 is applied as the low signal at the on level, the first TFT T1 and the fourth TFT T4 can be turned on. For example, a gate electrode of the first TFT T1 and a gate electrode of the fourth TFT T4 are connected together to receive the second clock signal GCLK2.

When the first TFT T1 is turned on, the low-level voltage of the start signal input circuit 132 is applied to the node A and thus the fifth TFT T5 can be turned on, and the low-level voltage is applied to the node Q and thus the sixth TFT T6 can be turned on (e.g., since 0-th TFT T0 always remains on).

When the fourth TFT T4 is turned on, the gate low voltage VGL is applied to the node QB through the fourth TFT T4, and thus the third TFT T3 and the seventh TFT T7 can be turned on. For example, a gate electrode of the third TFT T3 and a gate electrode of the seventh TFT T7 are connected together to receive a voltage applied to the node QB.

Accordingly, the sixth TFT T6 and the seventh TFT T7 are simultaneously turned on, and thus the high signal of the first clock signal GCLK1 input through the sixth TFT T6 and the gate high voltage VGH input through the seventh TFT T7 are shorted, and the high signal can be output from the output terminal SRO of the shift register.

The third clock signal GCLK3 input to the output circuit 134 can be applied as a low signal, and the fourth clock signal GCLK4 can be applied as a high signal.

The tenth TFT T10 that outputs the odd line scan signal SCAN_ODD can be turned on as the third clock signal GCLK3 is applied as the low signal, and the eleventh TFT T11 can be turned off as the fourth clock signal GCLK4 is applied as the high signal. Accordingly, the high signal of the output terminal SRO of the shift register can be output as the odd line scan signal SCAN_ODD through the tenth TFT T10.

The thirteenth TFT T13 that outputs the even line scan signal SCAN_EVEN can be turned on as the third clock signal GCLK3 is applied as the low signal, and the twelfth TFT T12 can be turned off as the fourth clock signal GCLK4 is applied as the high signal. Accordingly, the gate high voltage VGH can be output as the even line scan signal SCAN EVEN through the thirteenth TFT T13. For example, the odd line scan signal SCAN_ODD and the even line scan signal SCAN_EVEN are both output as the high signal during the first period t1.

Figure 7:
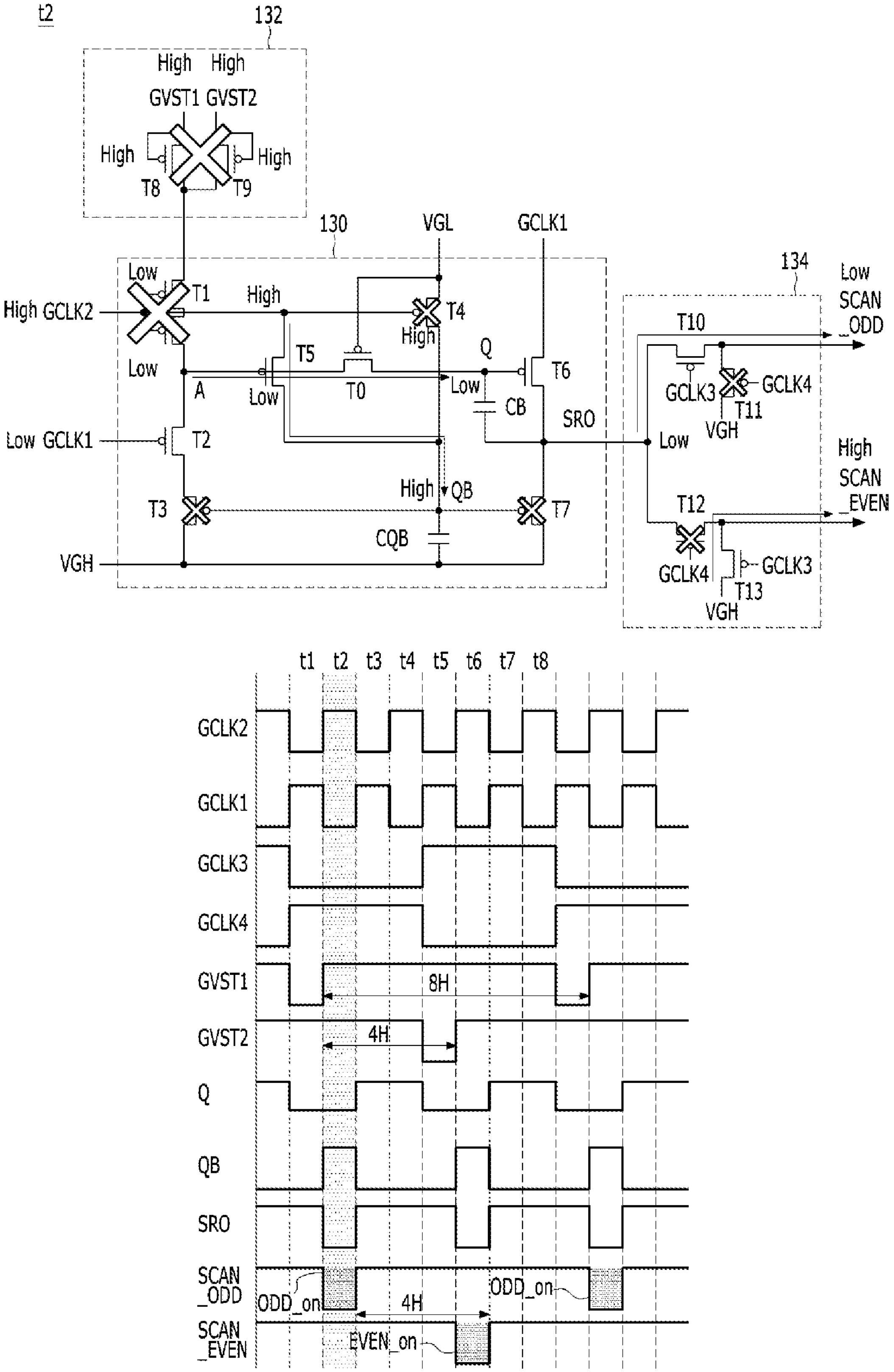

FIG. 7 is a diagram illustrating operation of the gate driver in the second period t2.

In the second period t2, both the first start signal GVST1 and the second start signal GVST2 can be applied as a high signal corresponding to the off level. Accordingly, the start signal input circuit 132 can maintain the low-level voltage of the previously output first start signal GVST1.

The first clock signal GCLK1 input to the switch circuit 130 can be applied as a low signal, and the second clock signal GCLK2 can be applied as a high signal.

As the first clock signal GCLK1 is applied as the low signal, the second TFT T2 can be turned on.

As the second clock signal GCLK2 is applied as the high signal, the first TFT T1 and the fourth TFT T4 can be turned off.

Since the voltage of the node A is maintained as the previously output low-level voltage, the fifth TFT T5 can be turned on, and the low-level voltage is applied to the node Q and thus the sixth TFT T6 can be turned on. As the fifth TFT T5 is turned on, the second clock signal GCLK2, which is the high signal, can be applied to the node QB. Accordingly, the third TFT T3 and the seventh TFT T7 connected to the node QB can be turned off.

The low-level voltage previously applied to the node Q by the node Q capacitor CB is maintained at the node Q, and thus the low signal can be output from the output terminal SRO of the shift register, and the sixth TFT T6 and the fifth TFT T5 can maintain the on state according to the low-level voltage of the node Q.

The third clock signal GCLK3 input to the output circuit 134 can be maintained as a low signal, and the fourth clock signal GCLK4 can be maintained as a high signal.

The tenth TFT T10 that outputs the odd line scan signal SCAN_ODD can be turned on as the third clock signal GCLK3 is applied as the low signal, and the eleventh TFT T11 can be turned off as the fourth clock signal GCLK4 is applied as the high signal.

Accordingly, the low signal of the output terminal SRO of the shift register can be output as the odd line scan signal SCAN_ODD through the tenth TFT T10.

The thirteenth TFT T13 that outputs the even line scan signal SCAN_EVEN can be turned on as the third clock signal GCLK3 is applied as the low signal, and the twelfth TFT T12 can be turned off as the fourth clock signal GCLK4 is applied as the high signal. Accordingly, the gate high voltage VGH can be output as the even line scan signal SCAN_EVEN through the thirteenth TFT T13. For example, the odd line scan signal SCAN_ODD outputs the low signal and the even line scan signal SCAN_EVEN outputs the high signal during the second period t2. Thus, the subpixels connected to the odd line scan signal SCAN_ODD are driven during the second period t2.

Figure 8:
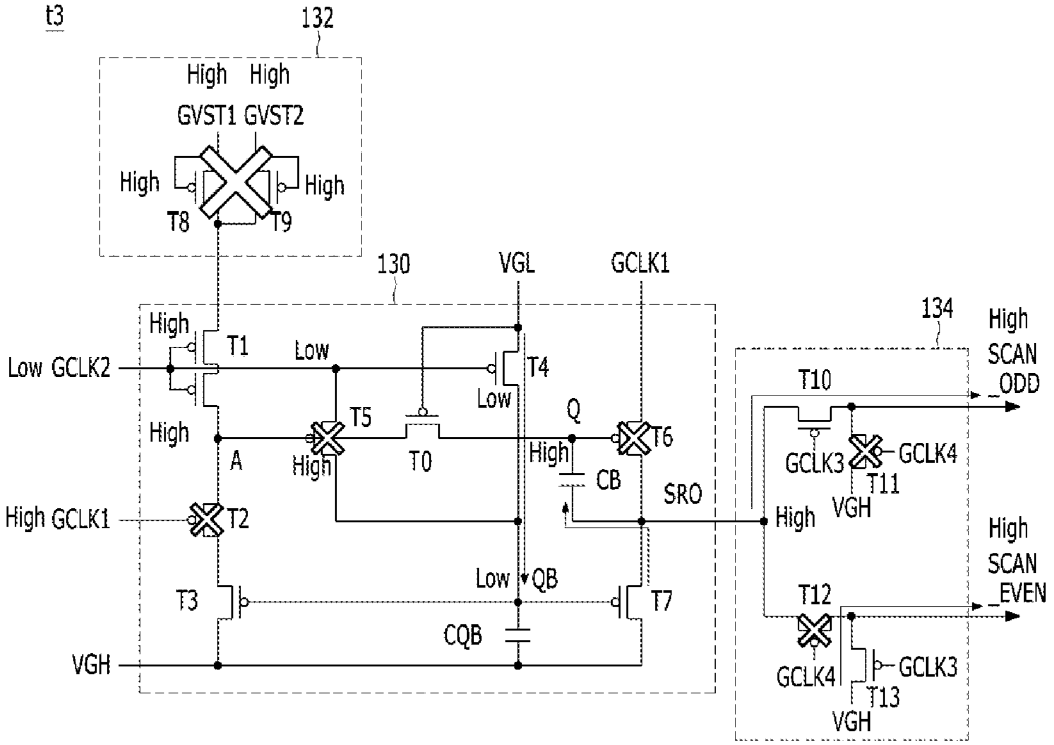
Figure 8:
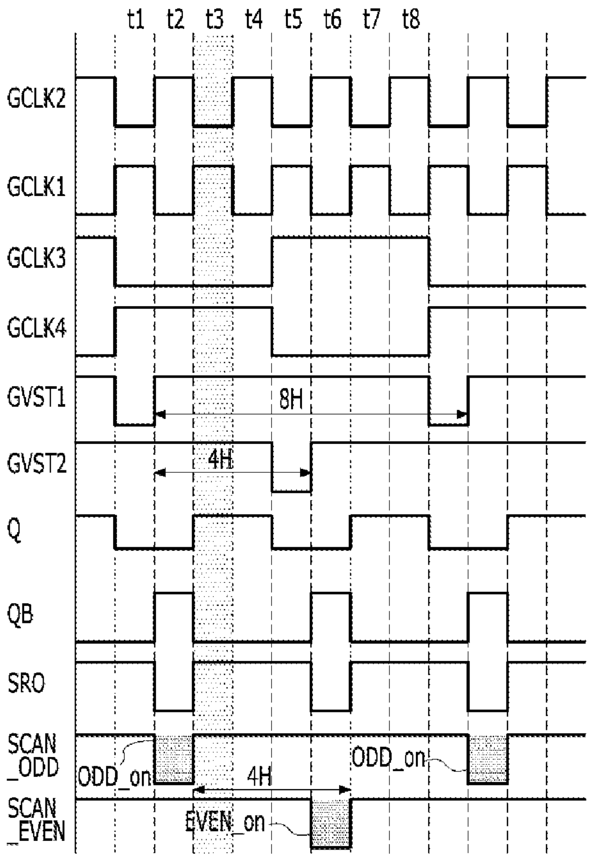

FIG. 8 is a diagram illustrating operation of the gate driver in the third period t3.

In the third period t3, both the first start signal GVST1 and the second start signal GVST2 can be applied as a high signal corresponding to the off level. Accordingly, the eighth TFT T8 and the ninth TFT T9 can be maintained in an off state.

The first clock signal GCLK1 input to the switch circuit 130 can be applied as a high signal, and the second clock signal GCLK2 can be applied as a low signal.

As the first clock signal GCLK1 is applied as the high signal, the second TFT T2 can be turned off.

As the second clock signal GCLK2 is applied as the low signal, the first TFT T1 and the fourth TFT T4 can be turned on.

When the fourth TFT T4 is turned on, the gate low voltage VGL is applied to the node QB through the fourth TFT T4, and thus the third TFT T3 and the seventh TFT T7 can be turned on. The node QB capacitor CQB maintains the low voltage and thus the seventh TFT T7 can be maintained in an on state.

As the seventh TFT T7 is turned on, the gate high voltage VGH is applied to the output terminal SRO of the shift register through the seventh TFT T7, and thus the high signal can be output from the output terminal SRO of the shift register. In addition, the high signal can be maintained at the node Q by the node Q capacitor CB connected to the output terminal SRO of the shift register.

The third clock signal GCLK3 input to the output circuit 134 can be maintained as a low signal, and the fourth clock signal GCLK4 can be maintained as a high signal.

The tenth TFT T10 that outputs the odd line scan signal SCAN_ODD can be turned on as the third clock signal GCLK3 is applied as the low signal, and the eleventh TFT T11 can be turned off as the fourth clock signal GCLK4 is applied as the high signal. Accordingly, the high signal of the output terminal SRO of the shift register can be output as the odd line scan signal SCAN_ODD through the tenth TFT T10.

The thirteenth TFT T13 that outputs the even line scan signal SCAN_EVEN can be turned on as the third clock signal GCLK3 is applied as the low signal, and the twelfth TFT T12 can be turned off as the fourth clock signal GCLK4 is applied as the high signal. Accordingly, the gate high voltage VGH can be output as the even line scan signal SCAN EVEN through the thirteenth TFT T13. For example, the odd line scan signal SCAN ODD and the even line scan signal SCAN_EVEN both output the high signal during the third period t3.

Figure 9:
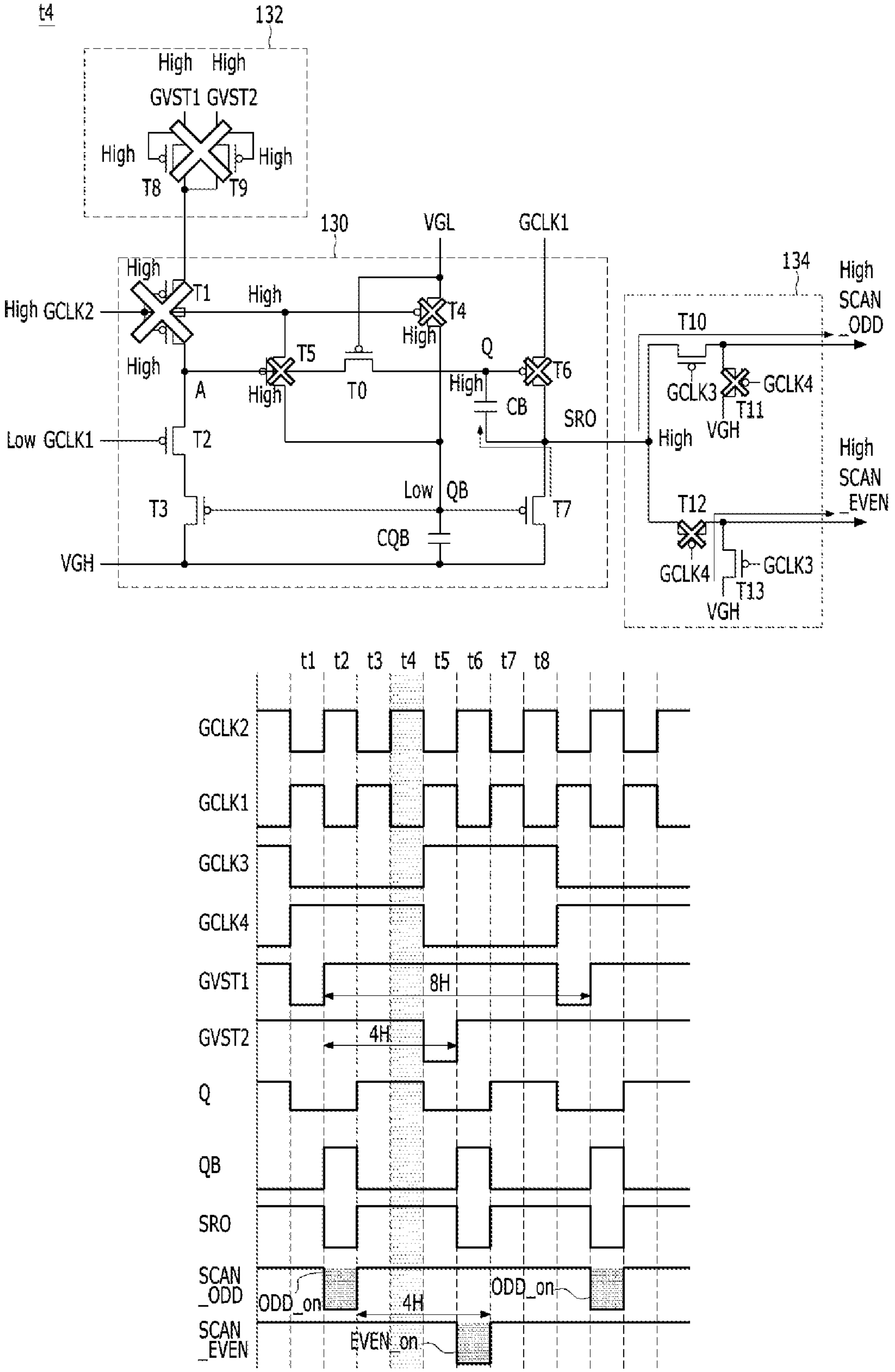

FIG. 9 is a diagram illustrating operation of the gate driver in the fourth period t4.

In the fourth period t4, both the first start signal GVST1 and the second start signal GVST2 can be applied as a high signal corresponding to the off level. Accordingly, the eighth TFT T8 and the ninth TFT T9 can be maintained in an off state.

The first clock signal GCLK1 input to the switch circuit 130 can be applied as a low signal, and the second clock signal GCLK2 can be applied as a high signal.

As the first clock signal GCLK1 is applied as the low signal, the second TFT T2 can be turned on.

As the second clock signal GCLK2 is applied as the high signal, the first TFT T1 and the fourth TFT T4 can be turned off.

The node QB maintains the previous low-level voltage state and thus the third TFT T3 and the seventh TFT T7 can be turned on. As the seventh TFT T7 is turned on, the gate high voltage VGH is applied to the output terminal SRO of the shift register through the seventh TFT T7, and thus the high signal can be output from the output terminal SRO of the shift register. In addition, the high signal can be maintained at the node Q by the node Q capacitor CB connected to the output terminal SRO of the shift register.

The third clock signal GCLK3 input to the output circuit 134 can be maintained as a low signal, and the fourth clock signal GCLK4 can be maintained as a high signal.

The tenth TFT T10 that outputs the odd line scan signal SCAN_ODD can be turned on as the third clock signal GCLK3 is applied as the low signal, and the eleventh TFT T11 can be turned off as the fourth clock signal GCLK4 is applied as the high signal. Accordingly, the high signal of the output terminal SRO of the shift register can be output as the odd line scan signal SCAN_ODD through the tenth TFT T10.

The thirteenth TFT T13 that outputs the even line scan signal SCAN_EVEN can be turned on as the third clock signal GCLK3 is applied as the low signal, and the twelfth TFT T12 can be turned off as the fourth clock signal GCLK4 is applied as the high signal. Accordingly, the gate high voltage VGH can be output as the even line scan signal SCAN EVEN through the thirteenth TFT T13. For example, the odd line scan signal SCAN_ODD and the even line scan signal SCAN_EVEN both output the high signal during the fourth period t4.

Figure 10:
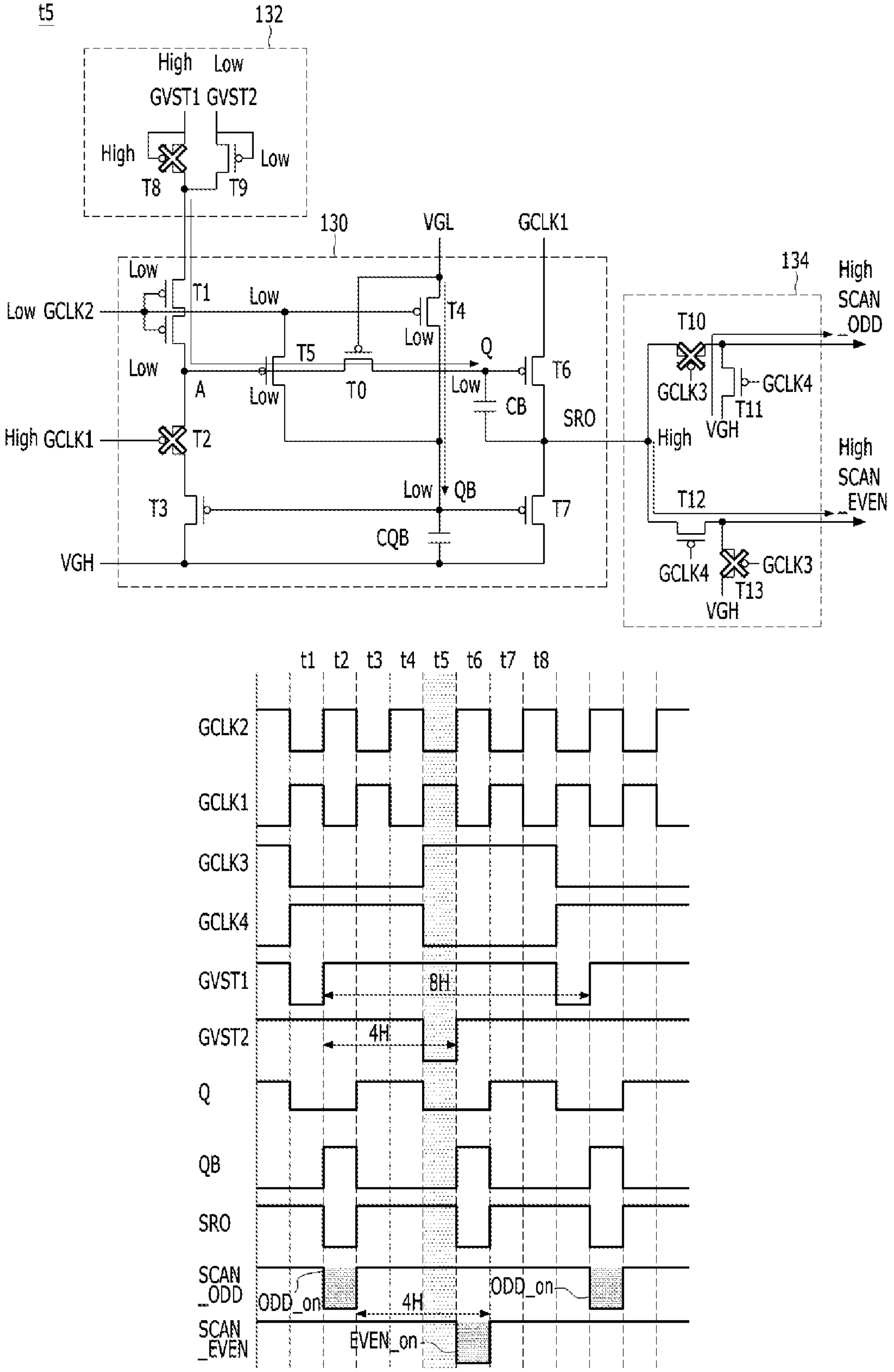

FIG. 10 is a diagram illustrating operation of the gate driver in the fifth period t5.

In the fifth period t5, the first start signal GVST1 can be applied as a high signal and the second start signal GVST2 can be applied as a low signal. As the first start signal GVST1 is input as the high signal, the eighth TFT T8 can be turned off. As the second start signal GVST2 is applied as the low signal, the ninth TFT T9 can be turned on. Accordingly, the low-level voltage of the second start signal GVST2 can be output from the start signal input circuit 132.

The first clock signal GCLK1 input to the switch circuit 130 can be applied as a high signal, and the second clock signal GCLK2 can be applied as a low signal corresponding to the on level.

As the first clock signal GCLK1 is applied as the high signal, the second TFT T2 can be turned off.

As second clock signal GCLK2 is applied as the low signal corresponding to the on level, the first TFT T1 and the fourth TFT T4 can be turned on.

When the first TFT T1 is turned on, the low-level voltage of the start signal input circuit 132 is applied to the node A and thus the fifth TFT T5 can be turned on, and the low-level voltage is applied to the node Q and thus the sixth TFT T6 can be turned on.

When the fourth TFT T4 is turned on, the gate low voltage VGL is applied to the node QB through the fourth TFT T4, and thus the third TFT T3 and the seventh TFT T7 can be turned on.

Accordingly, the sixth TFT T6 and the seventh TFT T7 are simultaneously turned on, and the high signal of the first clock signal GCLK1 input through the sixth TFT T6 and the gate high voltage VGH input through the seventh TFT T7 are shorted, and thus the high signal can be output from the output terminal SRO of the shift register.

The third clock signal GCLK3 input to the output circuit 134 can be applied as a high signal, and the fourth clock signal GCLK4 can be applied as a low signal.

The tenth TFT T10 that outputs the odd line scan signal SCAN_ODD can be turned off as the third clock signal GCLK3 is applied as the high signal, and the eleventh TFT T11 can be turned on as the fourth clock signal GCLK4 is applied as the low signal. Accordingly, the gate high voltage VGH can be output as the odd line scan signal SCAN_ODD through the eleventh TFT T11.

The thirteenth TFT T13 that outputs the even line scan signal SCAN_EVEN can be turned off as the third clock signal GCLK3 is applied as the high signal, and the twelfth TFT T12 can be turned on as the fourth clock signal GCLK4 is applied as the low signal. Accordingly, the high signal of the output terminal SRO of the shift register can be output as the even line scan signal SCAN_EVEN through the twelfth TFT T12. For example, the odd line scan signal SCAN_ODD and the even line scan signal SCAN_EVEN both output the high signal during the fifth period t5.

Figure 11:
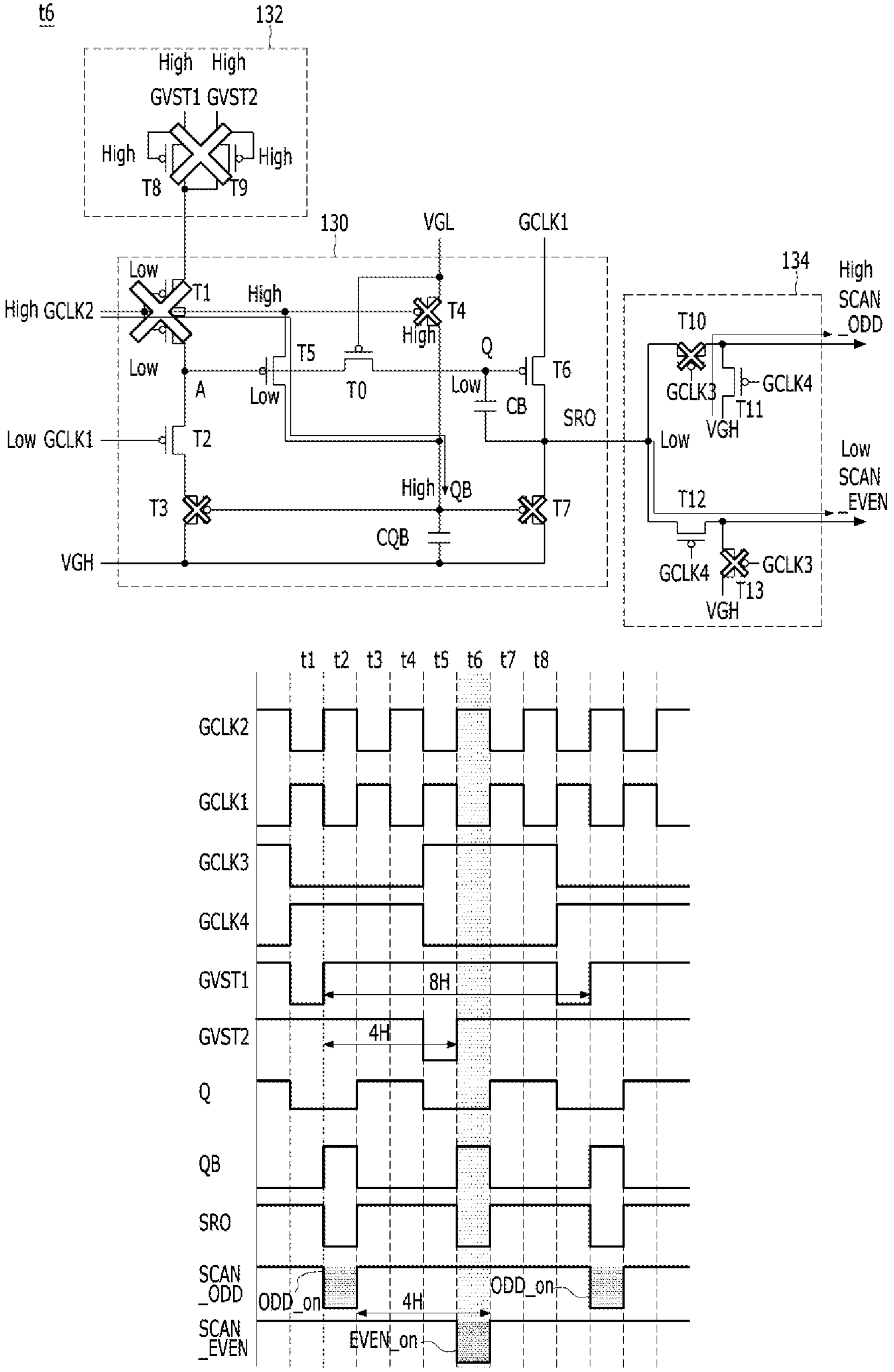

FIG. 11 is a diagram illustrating operation of the gate driver in the sixth period t6.

In the sixth period t5, both the first start signal GVST1 and the second start signal GVST2 can be applied as a high signal corresponding to the off level. Accordingly, the eighth TFT T8 and the ninth TFT T9 can be maintained in an off state. The low-level voltage of the previously output first start signal GVST1 can be maintained in the start signal input circuit 132.

The first clock signal GCLK1 input to the switch circuit 130 can be applied as a low signal, and the second clock signal GCLK2 can be applied as a high signal.

As the first clock signal GCLK1 is applied as the low signal, the second TFT T2 can be turned on.

As the second clock signal GCLK2 is applied as the high signal, the first TFT T1 and the fourth TFT T4 can be turned off.

Since the voltage of the node A is maintained as the previously output low-level voltage, the fifth TFT T5 can be turned on, and the low-level voltage is applied to the node Q and thus the sixth TFT T6 can be turned on. As the fifth TFT T5 is turned on, the second clock signal GCLK2, which is a high signal, can be applied to the node QB. Accordingly, the third TFT T3 and the seventh TFT T7 connected to the node QB can be turned off.

The low-level voltage previously applied to the node Q by the node Q capacitor CB is maintained, and thus the low signal can be output from the output terminal SRO of the shift register, and the sixth TFT T6 and the fifth TFT T5 can be maintained in an on state according to the low-level voltage of the node Q.

The third clock signal GCLK3 input to the output circuit 134 can be applied as a high signal, and the fourth clock signal GCLK4 can be applied as a low signal.

As the third clock signal GCLK3 is applied as the high signal, the tenth TFT T10 that outputs the odd line scan signal SCAN_ODD can be turned off and the eleventh TFT T11 can be turned on. Accordingly, the gate high voltage VGH can be output as the odd line scan signal SCAN_ODD through the eleventh TFT T11.

The third clock signal GCLK3 input to the output circuit 134 can be applied as a high signal, and the fourth clock signal GCLK4 can be applied as a low signal.

The tenth TFT T10 that outputs the odd line scan signal SCAN_ODD can be turned off as the third clock signal GCLK3 is applied as the high signal, and the eleventh TFT T11 can be turned on as the fourth clock signal GCLK4 is applied as the low signal.

Accordingly, the gate high voltage VGH can be output as the odd line scan signal SCAN_ODD through the eleventh TFT T11.

The thirteenth TFT T13 that outputs the even line scan signal SCAN_EVEN can be turned off as the third clock signal GCLK3 is applied as the high signal, and the twelfth TFT T12 can be turned on as the fourth clock signal GCLK4 is applied as the low signal. Accordingly, the low signal of the output terminal SRO of the shift register can be output as the even line scan signal SCAN_EVEN through the twelfth TFT T12. For example, the odd line scan signal SCAN_ODD outputs the high signal and the even line scan signal SCAN_EVEN outputs the low signal during the sixth period t6. Thus, the subpixels connected to the even line scan signal SCAN EVEN are driven during the sixth period t6.

Figure 12:
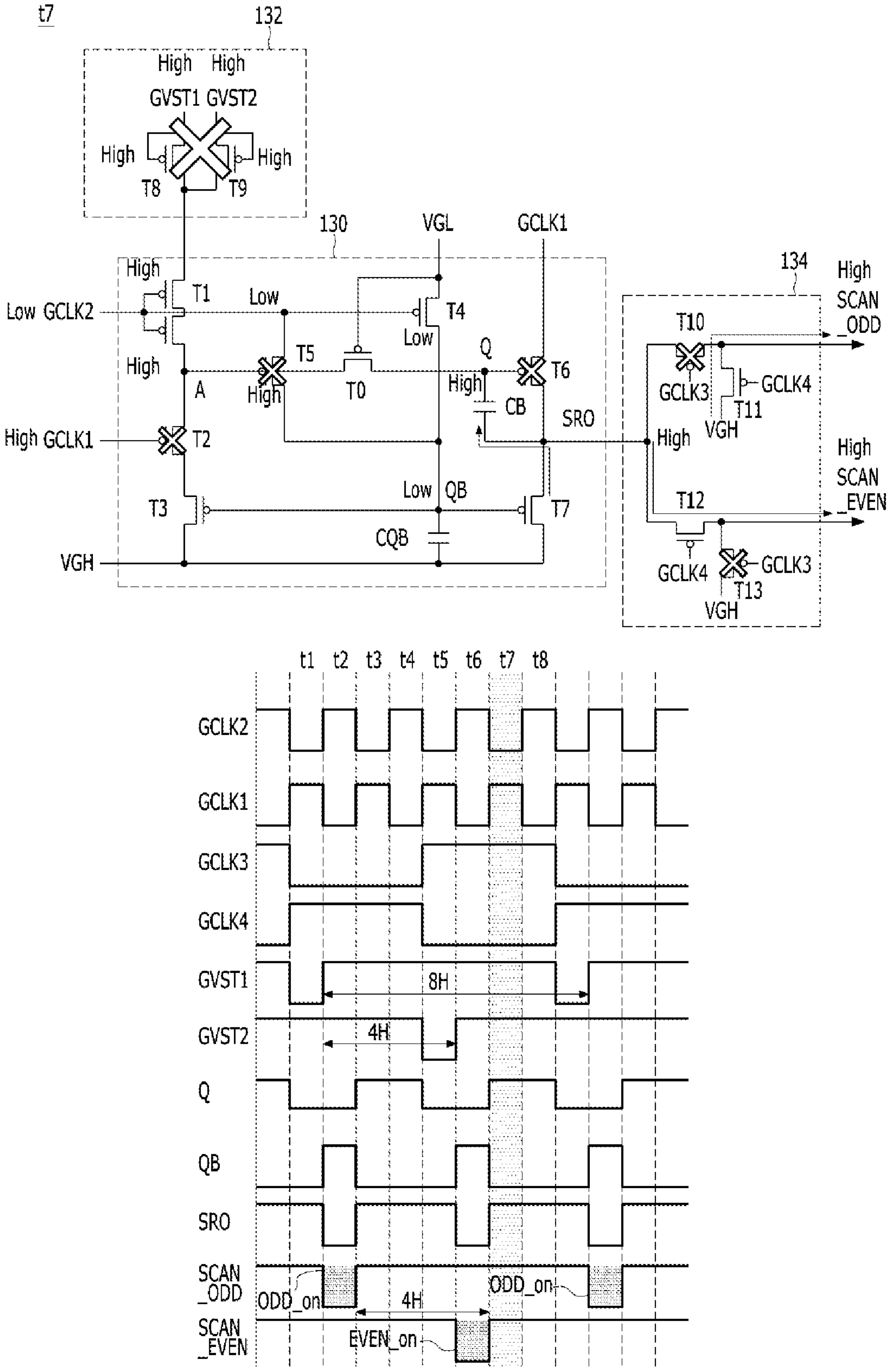

FIG. 12 is a diagram illustrating operation of the gate driver in the seventh period t7.

In the seventh period t7, both the first start signal GVST1 and the second start signal GVST2 can be applied as a high signal corresponding to the off level. Accordingly, the eighth TFT T8 and the ninth TFT T9 can be maintained in an off state.

The first clock signal GCLK1 input to the switch circuit 130 can be applied as a high signal, and the second clock signal GCLK2 can be applied as a low signal.

As the first clock signal GCLK1 is applied as the high signal, the second TFT T2 can be turned off.

As the second clock signal GCLK2 is applied as the low signal, the first TFT T1 and the fourth TFT T4 can be turned on.

When the fourth TFT T4 is turned on, the gate low voltage VGL is applied to the node QB through the fourth TFT T4, and thus the third TFT T3 and the seventh TFT T7 can be turned on. The node QB capacitor CQB maintains the low voltage and thus the seventh TFT T7 can be maintained in an on state.

As the seventh TFT T7 is turned on, the gate high voltage VGH is applied to the output terminal SRO of the shift register through the seventh TFT T7, and thus the high signal can be output from the output terminal SRO of the shift register. In addition, the high signal can be maintained at the node Q by the node Q capacitor CB connected to the output terminal SRO of the shift register.

The third clock signal GCLK3 input to the output circuit 134 can be applied as a high signal, and the fourth clock signal GCLK4 can be applied as a low signal.

The tenth TFT T10 that outputs the odd line scan signal SCAN_ODD can be turned off as the third clock signal GCLK3 is applied as the high signal, and the eleventh TFT T11 can be turned on as the fourth clock signal GCLK4 is applied as the low signal. Accordingly, the gate high voltage VGH can be output as the odd line scan signal SCAN_ODD through the eleventh TFT T11.

The thirteenth TFT T13 that outputs the even line scan signal SCAN_EVEN can be turned off as the third clock signal GCLK3 is applied as the high signal, and the twelfth TFT T12 can be turned on as the fourth clock signal GCLK4 is applied as the low signal. Accordingly, the high signal can be output as the even line scan signal SCAN_EVEN from the output terminal SRO of the shift register through the twelfth TFT T12. For example, the odd line scan signal SCAN_ODD and the even line scan signal SCAN_EVEN both output the high signal during the seventh period t7.

Figure 13:
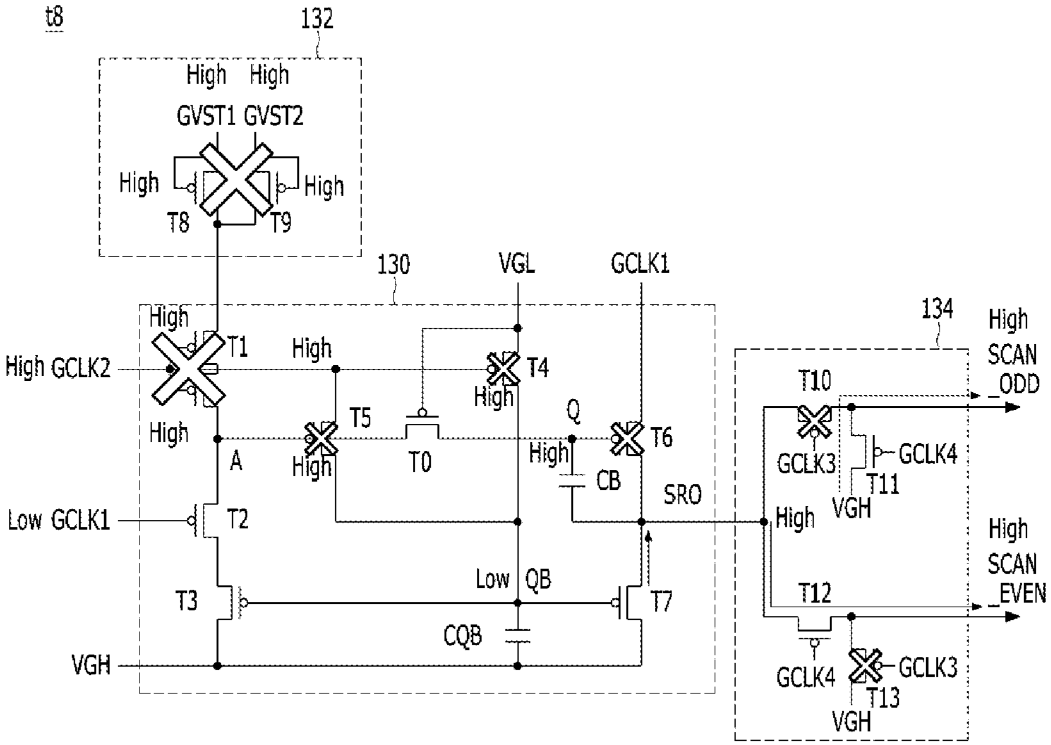
Figure 13:
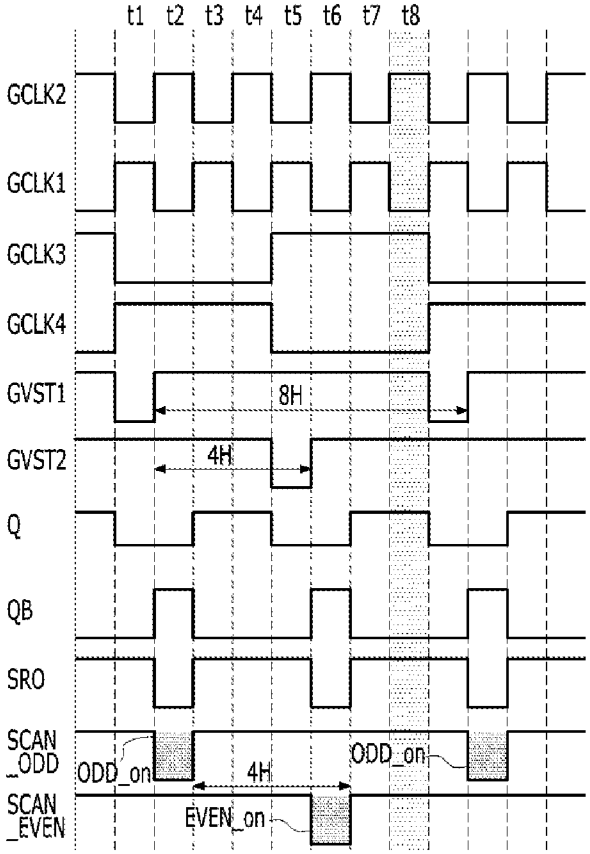

FIG. 13 is a diagram illustrating operation of the gate driver in the eighth period t8.

In the eighth period t8, both the first start signal GVST1 and the second start signal GVST2 can be applied as a high signal corresponding to the off level. Accordingly, the eighth TFT T8 and the ninth TFT T9 can be maintained in an off state.

The first clock signal GCLK1 input to the switch circuit 130 can be applied as a low signal, and the second clock signal GCLK2 can be applied as a high signal.

As the first clock signal GCLK1 is applied as the low signal, the second TFT T2 can be turned on.

As the second clock signal GCLK2 is applied as the high signal, the first TFT T1 and the fourth TFT T4 can be turned off.

The node QB maintains the previous low-level voltage state, and thus the third TFT T3 and the seventh TFT T7 can be turned on. As the seventh TFT T7 is turned on, the gate high voltage VGH is applied to the output terminal SRO of the shift register through the seventh TFT T7, and thus the high signal can be output from the output terminal SRO of the shift register. In addition, the high signal can be maintained at the node Q by the node Q capacitor CB connected to the output terminal SRO of the shift register.

The third clock signal GCLK3 input to the output circuit 134 can be applied as a high signal, and the fourth clock signal GCLK4 can be applied as a low signal.

The tenth TFT T10 that outputs the odd line scan signal SCAN_ODD can be turned off as the third clock signal GCLK3 is applied as the high signal, and the eleventh TFT T11 can be turned on as the fourth clock signal GCLK4 is applied as the low signal. Accordingly, the gate high voltage VGH can be output as the odd line scan signal SCAN_ODD through the eleventh TFT T11.

The thirteenth TFT T13 that outputs the even line scan signal SCAN_EVEN can be turned off as the third clock signal GCLK3 is applied as the high signal, and the twelfth TFT T12 can be turned on as the fourth clock signal GCLK4 is applied as the low signal. Accordingly, the high signal of the output terminal SRO of the shift register can be output as the even line scan signal SCAN_EVEN through the twelfth TFT T12. For example, the odd line scan signal SCAN_ODD and the even line scan signal SCAN_EVEN both output the high signal during the eight period t8.

As described above, the gate driver 13 according to the embodiment of the present disclosure receives the first start signal GVST1 and the second start signal GVST2 having the same cycle (8H) and a phase difference of 180 degrees, and alternately output on-level signals of the odd line scan signal SCAN_ODD and the even line scan signal SCAN EVEN in a half cycle (4H) such that light emission occurs line by line. Accordingly, an effect of operating at twice a driving speed can be obtained as compared to a situation in which scan signals are sequentially output using one start signal. In this way, the frame rate can be doubled while using less hardware and also reducing power consumption.

Figure 14:
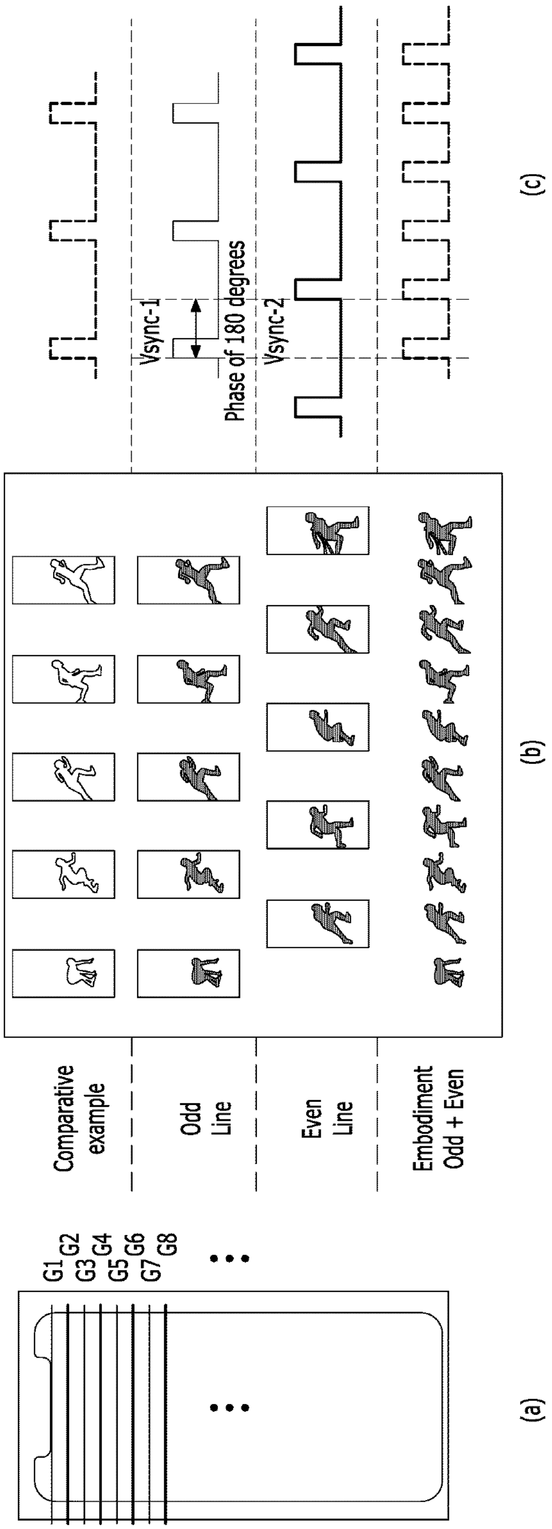
FIG. 14, including parts (a), (b) and (c), is a diagram illustrating screen display methods according to a comparative example and an embodiment of the present disclosure.

FIG. 14 is a diagram illustrating screen display methods according to a comparative example and an embodiment of the present disclosure.

As shown in part (a) of FIG. 14, in the embodiment of the present disclosure, gate lines GL1, GL2, . . . GL2N, of the entire display panel are divided into odd lines and even lines, and an image can be output in such a manner that one frame image is displayed using only odd-numbered gate lines, and then the next frame image is displayed using only even-numbered gate lines. For example, half of an image data can be displayed by odd lines during one frame, and a remaining half of the image data can be displayed by even lines during a subsequent frame. In this way, two halves of one full image are effectively interleaved with two frames (e.g., one odd frame followed by one even frame). In this way, the frame rate can be effectively doubled from a viewer's point of view while also reducing power and using fewer components (e.g., 120 Hz increased to 240 HZ).

Part (b) of FIG. 14 illustrates screen display methods of the comparative example and the embodiment of the present disclosure using the same driving frequency.

In the situation of displaying a screen according to the comparative example, an image can be displayed in such a manner that one frame image is displayed over all gate lines GL1, GL2, . . . GL2N, of the display panel according to the set driving frequency, and then the next frame image is displayed over all the gate lines GL1, GL2, . . . GL2N. For example, when the driving frequency is 120 Hz, 120 frames are displayed per second, and each frame can be displayed by supplying data voltages to all the gate lines GL1, GL2 . . . GL2N.

When a screen is displayed according to the embodiment of the present disclosure, the gate lines GL1, GL2, . . . GL2N, of the entire display panel are divided into odd lines and even lines, and one frame can be displayed using only odd lines or only even lines. To this end, the timing controller can divide image data into image data to be written on odd lines and image data to be written on even lines and provide the divided image data. Since one frame is displayed using only odd-numbered gate lines or only even-numbered gate lines, the size of image data per frame is reduced by half, but the number of displayed frames can be doubled. For example, if an input image is 120 Hz, 120 pieces of odd line frame data and 120 pieces of even line frame data are generated and output with a phase difference of 180 degrees therebetween, and thus the same effect as driving at 240 Hz can be obtained. For example, if an input image is 60 Hz, 60 pieces of odd line frame data and 60 pieces of even line frame data are generated and output with a phase difference of 180 degrees therebetween, and thus the same effect as driving at 120 Hz while driving at a low speed of 60 Hz can be obtained.

As shown in part (c) of FIG. 14, an image can be output with a phase difference of 180 degrees between an odd line and an even line. For example, the same effect as driving at a frame rate that is twice the actual driving frequency can be obtained. For example, at the time of displaying a 120 Hz image, odd line frame data is displayed at 120 Hz and even line frame data is also displayed at 120 Hz, with a phase difference of 180 degrees therebetween. When images are switched at a high speed as described above, the user does not recognize that each frame displays only an even line image or an odd line image, and thus can recognize that the corresponding image is driven at 240 Hz.

As described above, according to the embodiment of the present disclosure, one scan signal output circuit can be used to output both an odd line scan signal and an even line scan signal, and thus the number of circuit components can be reduced compared to the related art technology using two separate scan signal output circuits, and power consumption can be reduced due to a smaller number of TFTs being used. In other words, according to the embodiment of the present disclosure, the gate driver can do more while using fewer parts and with less power. In addition, since an odd frame and an even frame are displayed with a phase difference of 180 degrees, an effect of operating at twice the driving frequency can be obtained, and thus a high-quality image such as a high-frame-rate screen can be provided even by using only inexpensive LTPS semiconductor elements without an expensive switching device for low power and high speed operation, such as an oxide semiconductor device.

The display device according to one or more embodiments of the present disclosure can be described as follows.

The display device according to one embodiment of the present disclosure includes a display panel in which data lines and gate lines intersect and a plurality of sub-pixels are disposed on each of pixel lines, a data driver configured to supply data voltages to the data lines, a gate driver configured to supply scan signals to the gate lines, and a timing controller configured to control the data driver and the gate driver, in which the timing controller divides frame data of input image data into odd line frame data and even line frame data according to display order, and controls display cycles of the odd line frame data and the even line frame data to have a phase difference such that the odd line frame data is displayed on odd horizontal lines of the display panel according to a first frame frequency, and the even line frame data is displayed on even horizontal lines of the display panel according to the first frame frequency.

In the display device according to the embodiment of the present disclosure, the display cycles of the odd line frame data and the even line frame data can have a phase difference of 180 degrees.

In the display device according to the embodiment of the present disclosure, the odd line frame data and the even line frame data can be alternately displayed at a frame frequency twice the first frame frequency.

The gate driver of the display device according to the embodiment of the present disclosure can include a plurality of stages configured to output scan signals to the gate lines, and an output of each stage can be connected to a pair of gate lines adjacent to each other such that an odd-numbered scan signal is output to an odd-numbered line between the pair of gate lines and an even-numbered scan signal is output to an even-numbered line.

The gate driver of the display device according to the embodiment of the present disclosure can output the even-numbered scan signal with a delay time after outputting the odd-numbered scan signal.

The gate driver of the display device according to the embodiment of the present disclosure can output the odd-numbered scan signal and the even-numbered scan signal with a phase difference of 180 degrees therebetween.

The gate driver of the display device according to the embodiment of the present disclosure can include a start signal input circuit configured to receive a first start signal and a second start signal having a phase difference of 180 degrees from the first start signal and to output an on-level signal if at least one of the two signals is applied at an on level, a switch circuit configured to output a high signal or a low signal by switching a gate high voltage and a gate low voltage according to the on-level start signal input from the start signal input circuit and at least two clock signals, and an output circuit configured to output the output signal of the switch circuit and the gate high voltage signal as an odd-numbered scan signal and an even-numbered scan signal according to the at least two clock signals.

In the display device according to the embodiment of the present disclosure, odd-numbered scan signals are output at the on level if the first start signal is input at the on level, and even-numbered scan signals can be output at the on level if the second start signal is input at the on level.

The gate driver of the display device according to the embodiment of the present disclosure can be configured or implemented as TFTs including low temperature polysilicon (LTPS) as an active semiconductor layer.

The gate driver of the display device according to the embodiment of the present disclosure can include a first gate driver connected to one side of the gate lines to input scan signals, and a second gate driver connected to the other side of the gate lines to input scan signals.

In the gate driver configured to output scan signals to the gate lines of the display panel according to the embodiment of the present disclosure, the output of each stage can be connected to a pair of gate lines adjacent to each other such that an odd-numbered scan signal is output to an odd gate line between the pair of gate lines according to a first driving frequency, an even-numbered scan signal is output to an even gate line according to the first driving frequency, and the odd-numbered scan signal and even-numbered scan signal can be output with a phase difference of 180 degrees.

The gate driver according to the embodiment of the present disclosure can include a start signal input circuit configured to receive a first start signal and a second start signal having a phase difference of 180 degrees from the first start signal and to output an on-level signal if at least one of the two signals is applied at an on-level, a switch circuit configured to output a high signal or a low signal by switching a gate high voltage and a gate low voltage according to the on-level start signal input from the start signal input circuit and at least two clock signals, and an output circuit configured to output the output signal of the switch circuit and the gate high voltage signal as an odd-numbered scan signal and an even-numbered scan signal according to the at least two clock signals.

In the gate driver according to the embodiment of the present disclosure, odd-numbered scan signals can be output at the on level if the first start signal is input at the on level, and even-numbered scan signals can be output at the on level if the second start signal is input at the on level.

The gate driver according to the embodiment of the present disclosure can be configured or implemented as TFTs including LTPS as an active semiconductor layer.

Embodiments of the present disclosure have the following effects.

The embodiments of the present disclosure can provide a display device and a gate driver thereof capable of providing a high frame rate with low power consumption at a low cost, which can also use fewer parts.

According to the embodiment of the present disclosure, one scan signal output circuit outputs an odd line scan signal and an even line scan signal, and thus a circuit configuration can be reduced compared to a related art technology using two scan signal output circuits, and the display device can be driven with low power due to a small number of TFTs.

In addition, the embodiments of the present disclosure display an odd frame and an even frame with a phase difference of 180 degrees to achieve an effect of operating at twice a driving frequency, and thus it is possible to provide a high-quality image such as a high-frame-rate screen only using inexpensive LTPS semiconductor elements without an expensive switching device for low-power and high-speed operation, e.g., oxide semiconductor devices.

Although the embodiments of the present disclosure have been described in more detail with reference to the accompanying drawings, the present disclosure is not necessarily limited to these embodiments and can be modified and implemented in various manners without departing from the technical spirit of the present disclosure. Therefore, the embodiments disclosed herein are not intended to limit the technical spirit of the present disclosure, but to explain, and the scope of the technical spirit of the present disclosure is not limited by these embodiments. Therefore, the embodiments described above should be construed in all aspects as illustrative and not restrictive. The scope of the present disclosure should be determined by the appended claims and their legal equivalents, not by the above description, and all changes coming within the meaning and equivalency range of the appended claims are intended to be embraced therein.

What is claimed is:

1. A gate driver, comprising:

a plurality of stages configured to output scan signals, wherein an output of each stage among the plurality of stages is configured to:

connect to a pair of gate lines that are adjacent to each other, output an odd-numbered scan signal to an odd-numbered line among the pair of gate lines according to a first driving frequency, and output an even-numbered scan signal to an even-numbered line among the pair of gate lines according to the first driving frequency, and wherein a phase difference between the odd-numbered scan signal and the even-numbered scan signal is 180 degrees.

2. The gate driver of claim 1, further comprising:

a start signal input circuit configured to:

receive a first start signal and a second start signal having a phase difference of 180 degrees from the first start signal, and in response to at least one of the first start signal and the second start signal being an on level, output an on-level signal;

a switch circuit configured to output a high signal or a low signal by switching between a gate high voltage and a gate low voltage based on the on-level start signal received from the start signal input circuit and at least two clock signals; and an output circuit configured to output an output signal of the switch circuit and the signal of the gate high voltage as an odd-numbered scan signal and an even-numbered scan signal based on at least two clock signals.

3. The gate driver of claim 2, wherein the output circuit is further configured to:

in response to the first start signal being input at the on level, output the odd-numbered scan signal at the on level, and in response to the second start signal being input at the on level, output the even-numbered scan signal at the on level.

4. The gate driver of claim 2, wherein the gate driver is composed of thin film transistors (TFTs) including low temperature polysilicon (LTPS) as an active semiconductor layer.

5. A display device comprising:

a display panel including data lines, gate lines and a plurality of sub-pixels;

a data driver configured to supply data voltages to the data lines; and a gate driver configured to supply scan signals to the gate lines, wherein the gate driver includes a plurality of stages, and wherein an output of each stage among the plurality of stages is connected to a pair of gate lines that are adjacent to each other and configured to:

output an odd-numbered scan signal to an odd-numbered line among the pair of gate lines, and output an even-numbered scan signal to an even-numbered line among the pair of gate lines, and wherein the odd-numbered scan signal and the even-numbered scan signal are output with a phase difference of 180 degrees.

6. The display device of claim 5, wherein a phase difference between odd line frame data and the even line frame data is 180 degrees.

7. The display device of claim 5, wherein odd line frame data and even line frame data are alternately displayed at a second frame rate frequency that is twice a same first frame rate frequency.

8. The display device of claim 5, further comprising:

a timing controller configured to:

divide frame data of input image data into odd line frame data and even line frame data, display the odd line frame data on odd horizontal lines of the display panel, and display the even line frame data on even horizontal lines of the display panel, wherein the odd line frame data and the even line frame data have different phases and are displayed at a same first frame rate frequency.

9. The display device of claim 5, wherein the gate driver outputs the even-numbered scan signal with a delay time after outputting the odd-numbered scan signal.

10. The display device of claim 5, wherein the gate driver includes:

a start signal input circuit configured to:

receive a first start signal and a second start signal having a phase difference of 180 degrees from the first start signal, and in response to at least one of the first start signal and the second start signal being an on level, output an on-level signal;

a switch circuit configured to output a high signal or a low signal by switching between a gate high voltage and a gate low voltage based on the on-level start signal received from the start signal input circuit and at least two clock signals; and an output circuit configured to output an output signal of the switch circuit and the signal of the gate high voltage as an odd-numbered scan signal and an even-numbered scan signal based on at least two clock signals.

11. The display device of claim 10, wherein the output circuit is further configured to:

in response to the first start signal being input at the on level, output the odd-numbered scan signal at the on level, and in response to the second start signal being input at the on level, output the even-numbered scan signal is at the on level.

12. The display device of claim 10, wherein the gate driver includes low temperature polysilicon (LTPS) transistors.

13. The display device of claim 5, wherein the gate driver includes:

a first gate driver connected to a first side of the gate lines to input the scan signals; and a second gate driver connected to a second side of the gate lines to input the scan signals, the second side being opposite to the first side.

14. A stage circuit for a gate driver, the stage circuit comprising:

a start signal input circuit configured to receive at least one start signal and generate an output based on the at least one start signal;

a switch circuit configured to receive the output from the start signal input circuit and generate an output; and an output circuit configured to, in response to receiving the output generated by the switch circuit, output an odd-numbered scan signal to a first output terminal and output an even-numbered scan signal to a second output terminal, wherein the odd-numbered scan signal and the even-numbered scan signal have different phases and a same frequency, and wherein a phase difference between the odd-numbered scan signal and the even-numbered scan signal is 180 degrees.

15. The stage circuit of claim 14, wherein the at least one start signal includes a first start signal and a second start signal having a phase difference of 180 degrees from the first start signal.

16. The stage circuit of claim 15, wherein the start signal input circuit includes:

a first transistor including a first-first electrode configured to receive the first start signal, a first gate electrode connected to the first electrode, and a first-second electrode connected to the switch circuit; and a second transistor including a second-first electrode configured to receive the second start signal, a second gate electrode connected to the second-first electrode, and a second-second electrode connected to first-second electrode of the first transistor.

17. The stage circuit of claim 15, wherein the start signal input circuit is configured to:

in response to at least one of the first start signal and the second start signal being an on level, output an on-level signal to the switch circuit.

18. The stage circuit of claim 14, wherein the output circuit includes:

a first output transistor connected to an output terminal of the switch circuit, and configured to receive a first clock;

a second output transistor connected between the first output transistor and the first output terminal, and configured to receive a second clock;

a third output transistor connected to the output terminal of the switch circuit, and configured to receive the second clock; and a fourth output transistor connected between the third output transistor and the second output terminal, and configured to receive the first clock.

* * * * *